United States Patent
Meehan et al.

(10) Patent No.: US 10,399,572 B2
(45) Date of Patent: Sep. 3, 2019

(54) HYDRAULIC HYBRID PROPEL CIRCUIT WITH HYDROSTATIC OPTION AND METHOD OF OPERATION

(71) Applicant: Eaton Intelligent Power Limited, Dublin (IE)

(72) Inventors: Timothy Isaac Meehan, Waconia, MN (US); Michael William Olson, Minneapolis, MN (US)

(73) Assignee: Eaton Intelligent Power Limited (IE)

( * ) Notice: Subject to any disclaimer, the term of this patent is extended or adjusted under 35 U.S.C. 154(b) by 188 days.

(21) Appl. No.: 15/309,120

(22) PCT Filed: May 6, 2015

(86) PCT No.: PCT/US2015/029366
§ 371 (c)(1),
(2) Date: Nov. 4, 2016

(87) PCT Pub. No.: WO2015/171692
PCT Pub. Date: Nov. 12, 2015

(65) Prior Publication Data
US 2017/0113691 A1 Apr. 27, 2017

Related U.S. Application Data

(60) Provisional application No. 61/989,335, filed on May 6, 2014.

(51) Int. Cl.
*B60W 30/182* (2012.01)
*B66F 9/075* (2006.01)
(Continued)

(52) U.S. Cl.
CPC ............ *B60W 30/182* (2013.01); *B60K 6/12* (2013.01); *B60W 10/06* (2013.01); *B60W 10/20* (2013.01);
(Continued)

(58) Field of Classification Search
CPC .... B60W 30/182; B60W 10/06; B60W 10/30; B60W 30/188; B60K 61/12;
(Continued)

(56) References Cited

U.S. PATENT DOCUMENTS 3,238,722 A 3/1966 Berkman et al.
4,369,625 A 1/1983 Izumi et al.
(Continued)

FOREIGN PATENT DOCUMENTS

CN 1347818 A 5/2002
CN 101657646 A 2/2010
(Continued)

OTHER PUBLICATIONS

International Search Report and Written Opinion of the International Searching Authority for International Patent Application No. PCT/US2015/029366 dated Aug. 11, 2015, 12 pgs.
(Continued)

*Primary Examiner* — Muhammad Shafi
(74) *Attorney, Agent, or Firm* — Merchant & Gould P.C.

(57) ABSTRACT

A method of propelling a vehicle with a hybrid mode and a hydrostatic mode includes determining if a current propulsion mode is hybrid and if a selected mode is hydrostatic. A first transition mode is entered if the selected mode is hydrostatic and the current mode is hybrid. An engine-pump displacement target is set in the first transition mode. The method may include determining if the current mode is hybrid, hydrostatic, or a no-propulsion mode and if the selected mode is hybrid, hydrostatic, or no-propulsion. The engine-pump displacement target may be matched to a system consumption and an accumulator isolation valve closed when an engine-pump output matches the system consumption in the first transition mode. The method may include entering a second transition mode if the selected
(Continued)

mode is hybrid and the current mode is hydrostatic. A method of configuring a propulsion mode from hybrid to hydrostatic includes configuring a drive motor displacement target to full displacement, matching a pump displacement to system consumption, and closing an accumulator isolation valve when a pump flow output matches the system consumption.

22 Claims, 16 Drawing Sheets

(51) Int. Cl.
| | | |
|---|---|---|
| *E02F 9/20* | (2006.01) | |
| *E02F 9/22* | (2006.01) | |
| *B60K 6/12* | (2006.01) | |
| *F16H 61/42* | (2010.01) | |
| *B60W 10/06* | (2006.01) | |
| *B60W 10/20* | (2006.01) | |
| *B60W 10/30* | (2006.01) | |
| *B60W 30/188* | (2012.01) | |
| *B66F 9/22* | (2006.01) | |
| *F16H 61/4078* | (2010.01) | |
| *F16H 61/4096* | (2010.01) | |

(52) U.S. Cl.
CPC .......... *B60W 10/30* (2013.01); *B60W 30/188* (2013.01); *B66F 9/07572* (2013.01); *B66F 9/22* (2013.01); *E02F 9/2075* (2013.01); *E02F 9/2217* (2013.01); *E02F 9/2253* (2013.01); *E02F 9/2289* (2013.01); *E02F 9/2296* (2013.01); *F16H 61/4078* (2013.01); *F16H 61/4096* (2013.01); *F16H 61/42* (2013.01); *B60W 2300/121* (2013.01); *B60W 2530/00* (2013.01); *B60W 2710/06* (2013.01); *B60W 2710/09* (2013.01)

(58) Field of Classification Search
CPC ...... B66F 9/07572; B66F 9/22; E02F 9/2075; E02F 9/2217; E02F 9/2253
USPC .......................................................... 701/41
See application file for complete search history.

(56) References Cited

U.S. PATENT DOCUMENTS

| | | | |
|---|---|---|---|
| 4,778,020 A | | 10/1988 | Hagin et al. |
| 5,495,912 A | | 3/1996 | Gray, Jr. et al. |
| 5,505,527 A | | 4/1996 | Gray, Jr. et al. |
| 5,887,674 A | | 3/1999 | Gray, Jr. |
| 6,047,545 A | | 4/2000 | Deininger |
| 6,170,587 B1 | * | 1/2001 | Bullock .................. B60K 6/12 180/69.6 |
| 6,305,162 B1 | | 10/2001 | Cobo et al. |
| 6,619,325 B2 | | 9/2003 | Gray, Jr. |
| 6,655,136 B2 | | 12/2003 | Holt et al. |
| 6,719,080 B1 | | 4/2004 | Gray, Jr. |
| 6,840,334 B2 | * | 1/2005 | Marquardt .............. E02F 3/765 172/795 |
| 6,876,098 B1 | | 4/2005 | Gray, Jr. |
| 6,996,982 B2 | | 2/2006 | Gray, Jr. |
| 6,998,727 B2 | | 2/2006 | Gray, Jr. |
| 7,014,429 B2 | | 3/2006 | Gray, Jr. et al. |
| 7,108,016 B2 | | 9/2006 | Moskalik et al. |
| 7,121,304 B2 | | 10/2006 | Gray, Jr. |
| 7,252,020 B2 | | 8/2007 | Gray, Jr. et al. |
| 7,305,914 B2 | | 12/2007 | Gray, Jr. |
| 7,305,915 B2 | | 12/2007 | Gray, Jr. |
| 7,337,869 B2 | | 3/2008 | Gray, Jr. et al. |
| 7,374,005 B2 | | 5/2008 | Gray, Jr. |
| 7,456,509 B2 | | 11/2008 | Gray, Jr. |
| 7,500,424 B2 | | 3/2009 | Gray, Jr. et al. |
| 7,527,074 B1 | | 5/2009 | Gray, Jr. |
| 7,537,075 B2 | | 5/2009 | Gray, Jr. et al. |
| 7,553,085 B2 | | 6/2009 | Gray, Jr. |
| 7,594,802 B2 | | 9/2009 | Gray, Jr. |
| 7,617,761 B2 | | 11/2009 | Gray, Jr. |
| 7,677,871 B2 | | 3/2010 | Gray et al. |
| 7,770,697 B2 | | 8/2010 | Futahashi et al. |
| 7,857,082 B2 | | 12/2010 | Gray, Jr. |
| 7,905,088 B2 | | 3/2011 | Stephenson et al. |
| 7,984,783 B2 | | 7/2011 | Gray, Jr. et al. |
| 7,987,940 B2 | | 8/2011 | Bryson et al. |
| 8,020,587 B2 | | 9/2011 | Gray, Jr. |
| 8,052,116 B2 | | 11/2011 | Gray, Jr. |
| 8,079,437 B2 | | 12/2011 | Rosman |
| 8,087,733 B2 | | 1/2012 | Fouquet et al. |
| 8,100,221 B2 | | 1/2012 | Stuhldreher et al. |
| 8,177,009 B2 | | 5/2012 | Gray, Jr. |
| 8,187,147 B2 | | 5/2012 | Tryon et al. |
| 8,297,198 B2 | | 10/2012 | Read |
| 8,306,682 B2 | | 11/2012 | Gray, Jr. |
| 8,356,547 B2 | | 1/2013 | Gray, Jr. |
| 8,356,985 B2 | | 1/2013 | Gray. Jr. et al. |
| 8,375,982 B2 | | 2/2013 | Gray, Jr. |
| 8,381,851 B2 | | 2/2013 | Gray, Jr. |
| 9,453,503 B2 | | 9/2016 | Meehan |
| 9,989,042 B2 | | 6/2018 | Hoxie et al. |
| 2001/0030085 A1 | | 10/2001 | Nagata et al. |
| 2003/0115863 A1 | | 6/2003 | Holt et al. |
| 2004/0118623 A1 | | 6/2004 | Shore et al. |
| 2005/0042121 A1 | | 2/2005 | Suzuki et al. |
| 2005/0072397 A1 | | 4/2005 | Sluka et al. |
| 2005/0246082 A1 | | 11/2005 | Miki et al. |
| 2006/0051216 A1 | | 3/2006 | Gray, Jr. et al. |
| 2007/0095547 A1 | | 5/2007 | Moore |
| 2008/0110166 A1 | | 5/2008 | Stephenson et al. |
| 2008/0135325 A1 | | 6/2008 | Stuhldreher et al. |
| 2009/0145120 A1 | | 6/2009 | Esders et al. |
| 2009/0210120 A1 | | 8/2009 | Stein et al. |
| 2009/0247353 A1 | | 10/2009 | Tyron et al. |
| 2010/0186408 A1 | | 7/2010 | Rose et al. |
| 2010/0287922 A1 | | 11/2010 | Rosman |
| 2011/0030364 A1 | | 2/2011 | Persson et al. |
| 2011/0071716 A1 | | 3/2011 | Gray, Jr. |
| 2011/0073191 A1 | | 3/2011 | Gray, Jr. |
| 2011/0153129 A1 | | 6/2011 | Gray, Jr. |
| 2012/0324879 A1 | | 12/2012 | Haugen |
| 2013/0098012 A1 | | 4/2013 | Opdenbosch |
| 2013/0149093 A1 | * | 6/2013 | Kaneko .................. B60K 6/46 414/685 |
| 2013/0195681 A1 | | 8/2013 | Meehan |
| 2013/0232963 A1 | | 9/2013 | Jagoda |
| 2013/0280111 A1 | * | 10/2013 | Hoxie .................... F04B 17/05 417/364 |
| 2017/0335867 A1 | | 11/2017 | Meehan et al. |

FOREIGN PATENT DOCUMENTS

| | | |
|---|---|---|
| CN | 103282585 A | 9/2013 |
| CN | 103437392 A | 12/2013 |
| DE | 198 34 765 A1 | 2/2000 |
| DE | 101 28 582 A1 | 12/2002 |
| DE | 101 51 831 A1 | 5/2003 |
| DE | 10 2008 021 889 A1 | 11/2009 |
| DE | 10 2010 010 472 A1 | 9/2011 |
| EP | 0 140 046 B1 | 4/1987 |
| EP | 2 071 196 A1 | 6/2009 |
| JP | 2001-97693 | 4/2001 |
| JP | 2013-133172 A | 7/2013 |
| WO | 2009/006201 A2 | 1/2009 |
| WO | WO 2009/132765 A1 | 11/2009 |
| WO | WO 2016/069485 A1 | 5/2016 |

OTHER PUBLICATIONS

Hydraulic Hybrid Research, http://www.epa.gov/otaq/technology/research/research-hhvs.htm, 3 pages (Date Printed Jan. 4, 2012).

(56) References Cited

OTHER PUBLICATIONS

U.S. Appl. No. 61/326,317 entitled "Methods for Safe Operation of Hydraulic Hybrid Vehicles with Over-Center Pump/Motors".
Extended European Search Report for Application No. 15790021.8 dated Jan. 12, 2018.

* cited by examiner

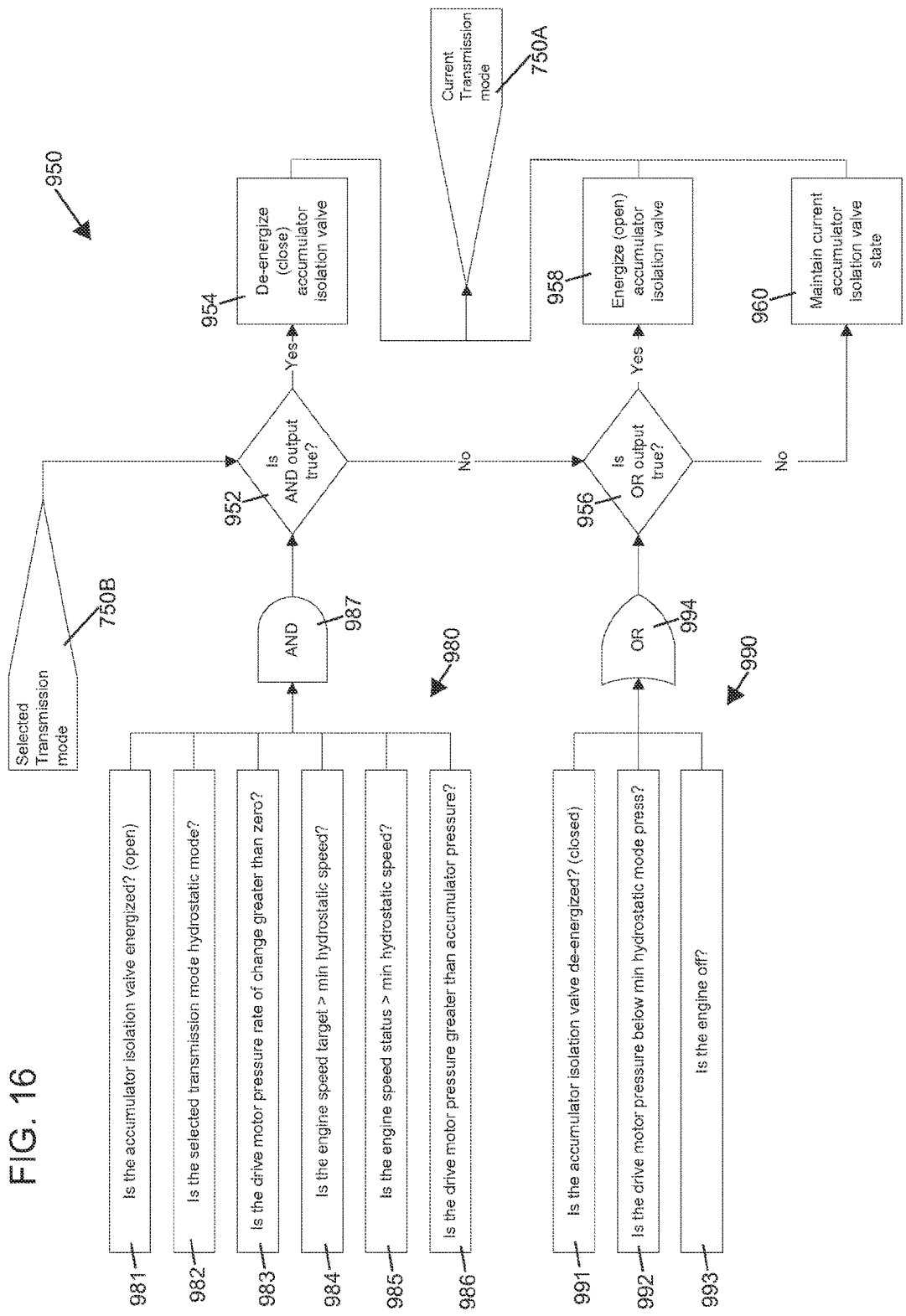

HYDRAULIC HYBRID PROPEL CIRCUIT WITH HYDROSTATIC OPTION AND METHOD OF OPERATION

CROSS-REFERENCE TO RELATED APPLICATION(S)

This application is a U.S. National Stage of PCT/US2015/029366, filed on 6 May 2015, which claims benefit of U.S. Patent Application Ser. No. 61/989,335 filed on May 6, 2014, and which applications are incorporated herein by reference. To the extent appropriate, a claim of priority is made to each of the above disclosed applications.

BACKGROUND

Work machines can be used to move material, such as pallets, dirt, and/or debris. Examples of work machines include fork lifts, wheel loaders, track loaders, excavators, backhoes, bull dozers, telehandlers, etc. The work machines typically include a work implement (e.g., a fork) connected to the work machine. The work implements attached to the work machines are typically powered by a hydraulic system. The hydraulic system can include a hydraulic pump that is powered by a prime mover, such as a diesel engine. The hydraulic pump can be connected to hydraulic actuators by a set of valves to control flow of pressurized hydraulic fluid to the hydraulic actuators. The pressurized hydraulic fluid causes the hydraulic actuators to extend, retract, or rotate and thereby cause the work implement to move.

The work machine may further include a propulsion system adapted to propel the work machine. The propulsion system may include a hydraulic pump that is powered by the prime mover. The propulsion system may include a hydrostatic drive.

SUMMARY

One aspect of the present disclosure relates to a method of propelling a mobile work vehicle with a hybrid propulsion mode and a hydrostatic propulsion mode. The method includes: 1) determining if a current propulsion mode is the hybrid propulsion mode; 2) determining if a selected propulsion mode is the hydrostatic propulsion mode; 3) entering a first transition mode from the hybrid propulsion mode if the selected propulsion mode is the hydrostatic propulsion mode and the current propulsion mode is the hybrid propulsion mode; and 4) setting an engine-pump displacement target when in the first transition mode. In certain embodiments, the method may include determining if the current propulsion mode is the hybrid propulsion mode, the hydrostatic propulsion mode, or a no-propulsion mode; and determining if the selected propulsion mode is the hybrid propulsion mode, the hydrostatic propulsion mode, or the no-propulsion mode. The method may further include substantially matching the engine-pump displacement target to a system flow consumption, when in the first transition mode, and closing an accumulator isolation valve when an engine-pump flow output matches the system flow consumption, when in the first transition mode. The method may further include closing the accumulator isolation valve when both the engine-pump flow output matches the system flow consumption and a drive-motor pressure rate of change is greater than a predetermined value when in the first transition mode. The method may further include entering a second transition mode from the hydrostatic propulsion mode if the selected propulsion mode is the hybrid propulsion mode and the current propulsion mode is the hydrostatic propulsion mode.

Another aspect of the present disclosure relates to a method of configuring a propulsion mode of a mobile work vehicle from a hybrid propulsion mode to a hydrostatic propulsion mode. The method includes: 1) determining if a selected propulsion mode is the hydrostatic propulsion mode; 2) configuring a drive motor displacement target of a drive motor to full displacement if the selected propulsion mode is the hydrostatic propulsion mode; 3) substantially matching an engine-pump displacement target to a system flow consumption if the selected propulsion mode is the hydrostatic propulsion mode; and 4) closing an accumulator isolation valve when an engine-pump flow output matches the system flow consumption and the selected propulsion mode is the hydrostatic propulsion mode.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DESCRIPTION OF THE DRAWINGS

Non-limiting and non-exhaustive embodiments are described with reference to the following figures, which are not necessarily drawn to scale, wherein like reference numerals refer to like parts throughout the various views unless otherwise specified.

FIG. 16 is a valve supervisory flow chart suitable for use with the valve supervisory process of FIG. 12.

DETAILED DESCRIPTION

Figure 1:
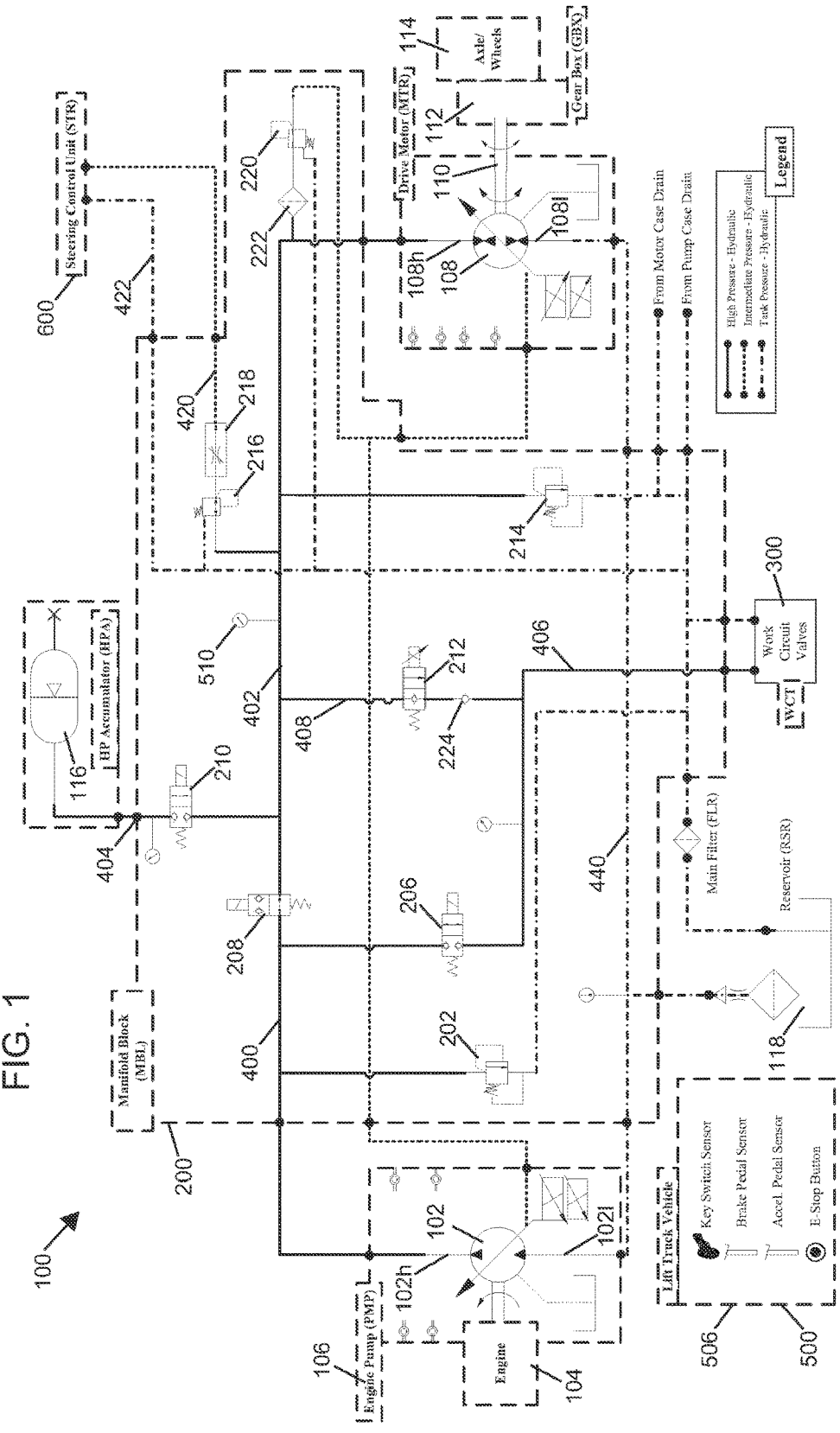
FIG. 1 is a schematic diagram of a hydraulic system having features that are examples according to the principles of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The present disclosure relates generally to hydraulic circuit architectures for use in work vehicles. A hydraulic circuit architecture, in accordance with the principles of the present disclosure, can include a propel circuit and a work circuit. In certain embodiments, the propel circuit and the work circuit can be powered by a same hydraulic pump structure (e.g., a hydraulic pump or a hydraulic pump/motor). In certain embodiments, the hydraulic pump structure includes a single drive pump (e.g., only one pump, only one pumping rotating group, only one pump/motor, etc.). In certain embodiments, the propel circuit can include a hydraulic accumulator and a hydraulic propulsion pump/motor for powering propulsion elements (e.g., wheels, tracks, etc.) of the work vehicle through a drivetrain. The work circuit can include various actuators for powering work components such as lifts, clamps, booms, buckets, blades, and/or other structures. The various actuators may include hydraulic cylinders, hydraulic motors, etc. In a preferred embodiment, the hydraulic architecture is used on a forklift 50 (see FIG. 9) where the propulsion circuit powers a drivetrain 114 coupled to drive wheels 54 of the forklift 50, and the work circuit includes valving and actuators (e.g., hydraulic cylinders) for raising and lowering a fork 52 of the forklift 50, for front-to-back tilting of the fork 52, and for left and right shifting of the fork 52.

In certain embodiments, the hydraulic accumulator of the propulsion circuit can be used to provide numerous functions and benefits. For example, the provision of the hydraulic accumulator allows the hydraulic pump/motor and prime mover powering the propulsion circuit to be consistently operated at peak efficiency or near peak efficiency. Moreover, accumulated energy in the hydraulic accumulator can be used to provide power for starting a power source (e.g., a prime mover, a diesel engine, or other engine) used to drive the hydraulic pump/motor. Additionally, the hydraulic accumulator can be used to provide propulsion functionality even when the power source coupled to the hydraulic pump/motor is not operating. Similarly, the hydraulic accumulator can be used to provide work circuit functionality even when the power source coupled to the hydraulic pump/motor is not operating. Furthermore, by operating the propulsion hydraulic pump/motor as a motor during braking/deceleration events, energy corresponding to the deceleration of the work vehicle can be back-fed and stored by the hydraulic accumulator for later re-use to enhance overall efficiency of the work vehicle.

In certain embodiments, one (i.e., a single) hydraulic pump/motor (e.g., a hydraulic pump/motor 102, shown at FIG. 1) is used to power both the propulsion circuit and the working circuit. In such an embodiment, a circuit selector (i.e., a mode selector) can be provided for selectively placing a high pressure side of the hydraulic pump/motor in fluid communication with either the propulsion circuit or the working circuit. The circuit selector can include one or more valves. Furthermore, a cross-over valve can be provided for selectively providing fluid communication between the propulsion circuit and the work circuit. By opening the cross-over valve, power from the hydraulic accumulator can be used to drive one or more actuators of the work circuit thereby allowing for actuation of the actuators of the work circuit, even when the power source is turned off. When the circuit selector has placed the pump/motor in fluid communication with the propulsion circuit for propelling the work vehicle, the various components of the work circuit can be actuated by opening the cross-over valve. Additionally, when the circuit selector has placed the pump/motor in fluid communication with the work circuit, the hydraulic accumulator can be used to provide for propulsion and steering of the work vehicle. It will be appreciated that a steering component is preferably incorporated into the hydraulic propulsion circuit. When the power source is turned off, the hydraulic accumulator can be used to power the steering component, power the propulsion elements, and/or power the various components of the work circuit. It will be appreciated that such activities can be conducted individually or simultaneously. The cross-over valve can provide a variable size orifice.

In certain embodiments, the hydraulic pump/motor coupled to the power source is an open circuit pump/motor having a rotating group and a swash plate that is adjustable to control an amount of hydraulic fluid displaced by the pump/motor per rotation of a pump/motor shaft by the power source. In certain embodiments, the swash plate has an over-center configuration. When the pump/motor is operating as a pump, the swash plate is on a first side of center and the power source rotates the pump/motor shaft in a first direction such that hydraulic fluid is pumped through the pump/motor from a low pressure side in fluid communication with a reservoir/tank to a high pressure side in fluid communication with the circuit selector. When the hydraulic pump/motor is operated as a motor, the swash plate may be moved to a second side of center and hydraulic fluid from the hydraulic accumulator is directed through the pump/motor from the high pressure side to the low pressure side thereby causing the pump/motor shaft to rotate in the same rotational direction that the pump/motor shaft rotates when driven by the power source. In this way, hydraulic energy from the hydraulic accumulator can be used to start modes including use of the power source.

Figure 8:
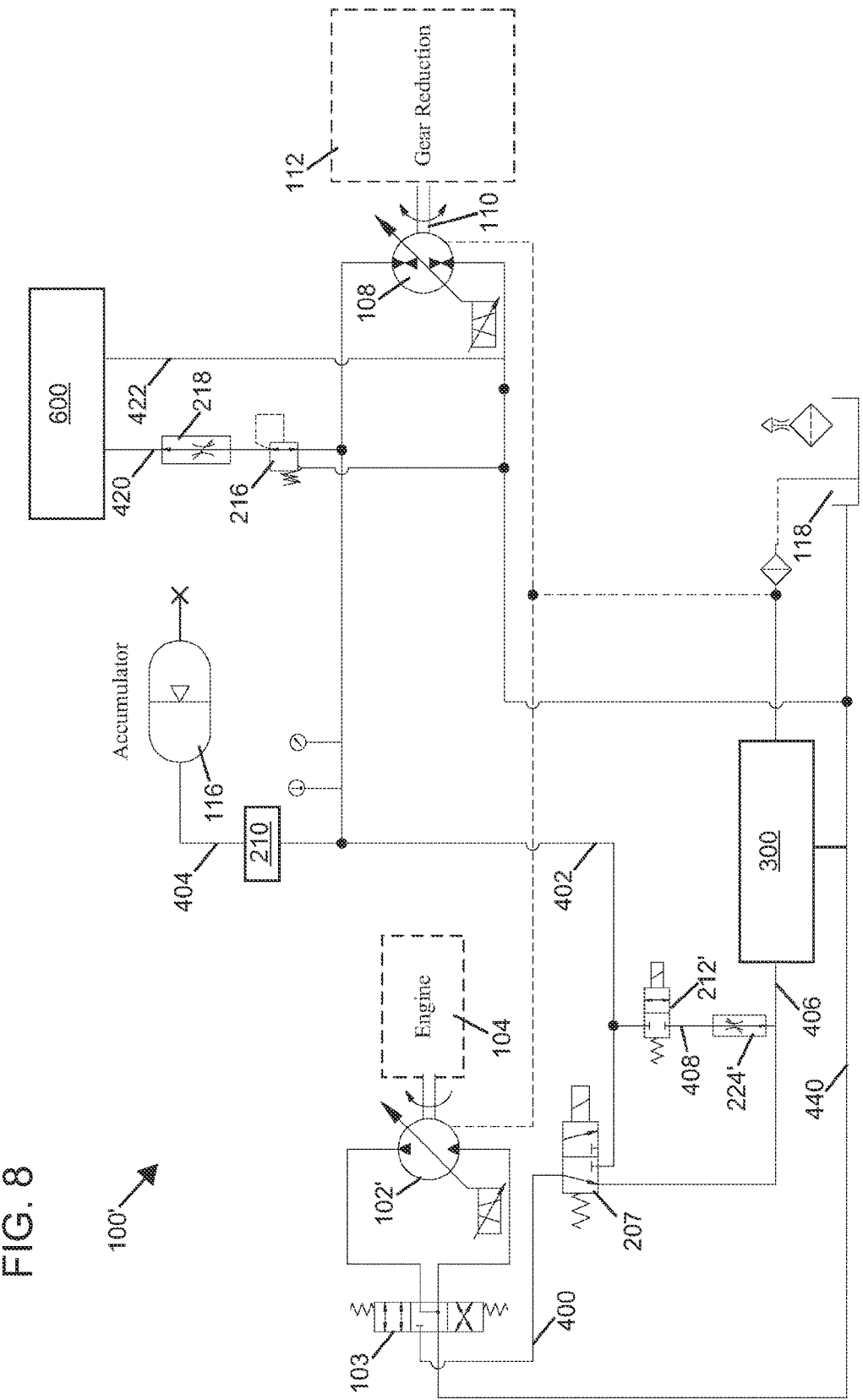
FIG. 8 is a schematic diagram of another hydraulic system having features that are examples according to the principles of the present disclosure.

The propulsion pump/motor can also be an open circuit pump/motor having a low pressure side connected to the reservoir/tank and a high pressure side that connects to the hydraulic pump/motor coupled to the power source through the circuit selector. The propulsion pump/motor can include a rotating group and a swash plate that can be adjusted to control displacement of the propulsion pump/motor for each revolution of a shaft of the propulsion pump/motor. The swash plate can be an over-center swash plate that allows for bi-directional rotation of the shaft of the propulsion pump/motor. For example, when the swash plate is on a first side of center, hydraulic fluid flow through the pump/motor from the high pressure side to the low pressure side can drive the shaft in a clockwise direction. In contrast, when the swash plate is on a second side of center, hydraulic fluid flow through the propulsion pump/motor in a direction from the high pressure side to the low pressure side causes rotation of the shaft in a counterclockwise direction. In this way, the propulsion pump/motor can be used to drive the work vehicle in both forward and rearward directions. Moreover, during a braking event, the propulsion pump/motor can function as a pump and can direct hydraulic fluid from the reservoir to the hydraulic accumulator to charge the hydraulic accumulator thereby capturing energy associated with the deceleration. Thus, the propulsion pump/motor and the hydraulic accumulator provide a braking/deceleration and energy storage function. It will be appreciated that in other embodiments (e.g., an embodiment illustrated at FIG. 8), valving can be used in combination with non-over-center pump/motors to provide the same or similar functionality as the over-center pump/motors described above. The non-over-center pump/motors and the valving can be used as the hydraulic pump/motor coupled to the power source, as shown at FIG. 8, and/or can be used as the propulsion hydraulic pump/motor that is coupled to the drivetrain.

Further details of such a hydraulic circuit architecture are described and illustrated at U.S. Patent Publication US 2013/0280111 A1 which is hereby incorporated by reference in its entirety. FIGS. 1-10 illustrate various hydraulic circuits and a control system 500 and further illustrate the hydraulic circuit architecture in a context of a work machine 50. Methods of operating such a hydraulic circuit architecture are described and illustrated hereinafter.

According to the principles of the present disclosure, methods of operating the hydraulic circuit architecture provide smooth and beneficial use of the work machine 50. Hydraulic hybrid vehicles typically operate at pressures below a maximum system operating pressure to allow for energy storage capacity in an accumulator and to increase operating displacement of a pump and motor to increase pump and motor efficiency. However, this typically limits the torque that can be delivered quickly to a drivetrain when climbing a hill, accelerating hard, or any other time that high torque is desired. This lack of instantaneous torque can be eliminated by isolating the high pressure accumulator from the system and operating the vehicle in a typical hydrostatic mode where pressure (and thereby torque) can be raised very quickly and to pressure levels that may exceed an operating pressure of the high pressure accumulator.

Figure 11:
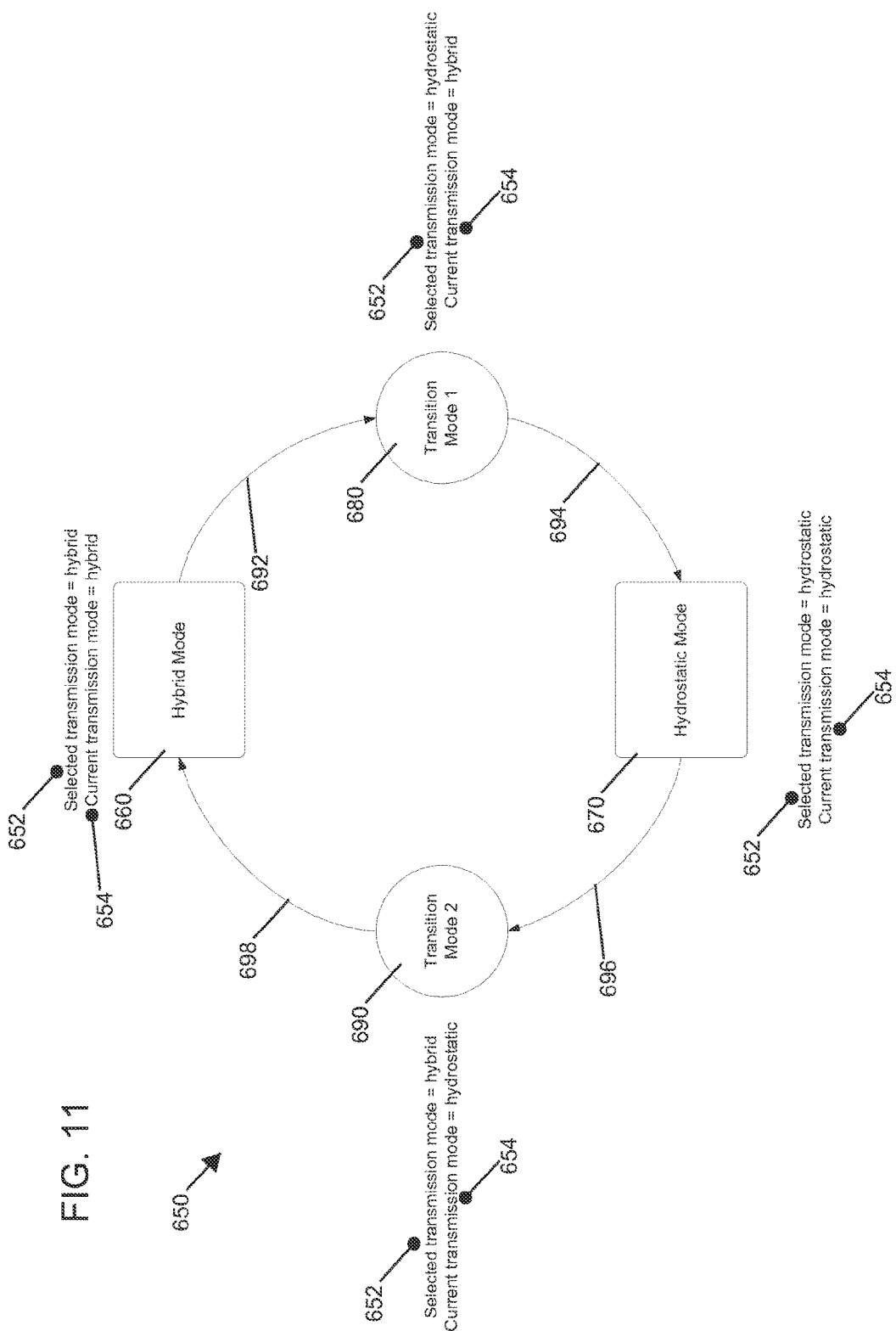
FIG. 11 is a state chart of a transmission mode supervisory control system according to the principles of the present disclosure, the state chart including a hybrid mode, a hydrostatic mode, and two transition modes between the hybrid mode and the hydrostatic mode.

Turning now to FIG. 11, an example transmission mode supervisory control state machine 650 is illustrated according to the principles of the present disclosure. As depicted, the control state machine 650 includes a hybrid mode 660, a hydrostatic mode 670, a first transition mode 680, and a second transition mode 690. The first transition mode 680 is activated when transitioning from the hybrid mode 660 to the hydrostatic mode 670. Likewise, the second transition mode 690 is activated when transitioning from the hydrostatic mode 670 to the hybrid mode 660. As depicted, a path 692 illustrates a switch from the hybrid mode 660 to the first transition mode 680. Likewise, a path 694 illustrates switching from the first transition mode 680 to the hydrostatic mode 670. Similarly, a path 696 illustrates switching from the hydrostatic mode 670 to the second transition mode 690. And, a path 698 illustrates switching from the second transition mode 690 to the hybrid mode 660. As depicted, the supervisory control state machine 650 includes two transmission modes 660, 670 and two transitional modes 680, 690. In other embodiments, additional modes, additional transition modes, and/or additional paths between the various modes may be included.

Figure 13:
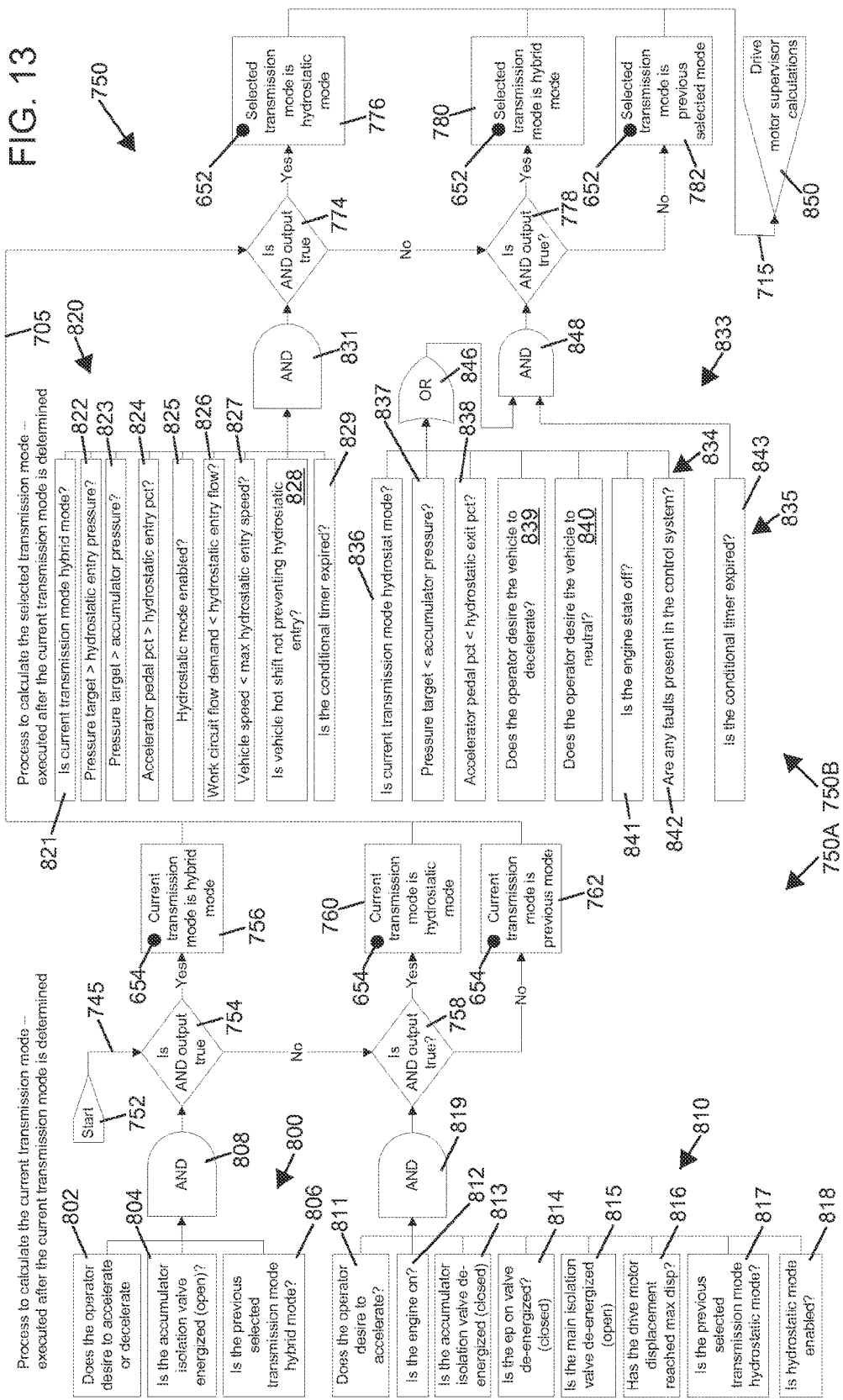
FIG. 13 is a transmission mode flow chart suitable for use in the transmission mode process of FIG. 12.

A state of the transmission state machine 650 is determined by the combination of a selected transmission mode 652 and a current transmission mode 654 and their respective values as determined by the logic outlined in the flow charts 750A and 750B of FIG. 13. The hybrid mode 660 of the control state machine 650 may include functional and operational characteristics of and/or may activate a hybrid propel mode 84, further described hereinafter. When the selected transmission mode 652 is set to the hybrid propel mode 84, and the current transmission mode 654 is set to the hybrid propel mode 84, the state of the transmission state machine 650 is set to the hybrid propel mode 660. The hydrostatic mode 670 likewise may include operational and functional characteristics of and/or may activate a hydrostatic mode 86, further described hereinafter. When the selected transmission mode 652 is set to the hydrostatic mode 86, and the current transmission mode 654 is set to the hydrostatic mode 86, the state of the transmission state machine 650 is set to the hydrostatic propel mode 670.

As depicted at FIG. 11, the transmission mode supervisory control state machine 650 (i.e., the supervisory controller) has the two states of the hybrid mode 660 and the hydrostatic mode 670. In other embodiments, additional states may be included. For example, a work circuit state that includes operational and functional characteristics of and/or activates a work circuit primary mode 82, described hereinafter, may be included.

The transition modes 680, 690 are defined to control transitional behavior between the states 660, 670. In particular, the first transition mode 680 controls the transitional behavior when switching from the hybrid mode state 660 to the hydrostatic mode state 670. Likewise, the second transition mode 690 controls the transitional behavior when switching from the hydrostatic mode state 670 to the hybrid mode state 660. In other embodiments, other transitional modes may be defined to and from the various other states (e.g. a state including operational and functional characteristics of and/or activating the work circuit primary mode 82).

The current transmission mode 654 is defined by the existing state of the valves and system actuators. The selected transmission mode 652 is defined by operator behavior. The state of the transmission mode of the control state machine 650 defines the hybrid system component behavior when in the hybrid mode 660. Likewise, the state of the transmission mode of the control state machine 650 defines the hydrostatic system component behavior when in the hydrostatic mode 670. When in the first transition mode 680, the selected transmission mode 652 is the hydrostatic mode 86, and the current transmission mode 654 is the hybrid propel mode 84. Likewise, when in the second transition mode 690, the selected transmission mode 652 is set to the hybrid propel mode 84, and the current transmission mode 654 is set to the hydrostatic mode 86. The state machine 650 is executed on every computational loop of the supervisory algorithm, in certain embodiments. In the depicted embodiment, the current transmission mode is determined first, and the selected transmission mode is determined second.

Figure 12:
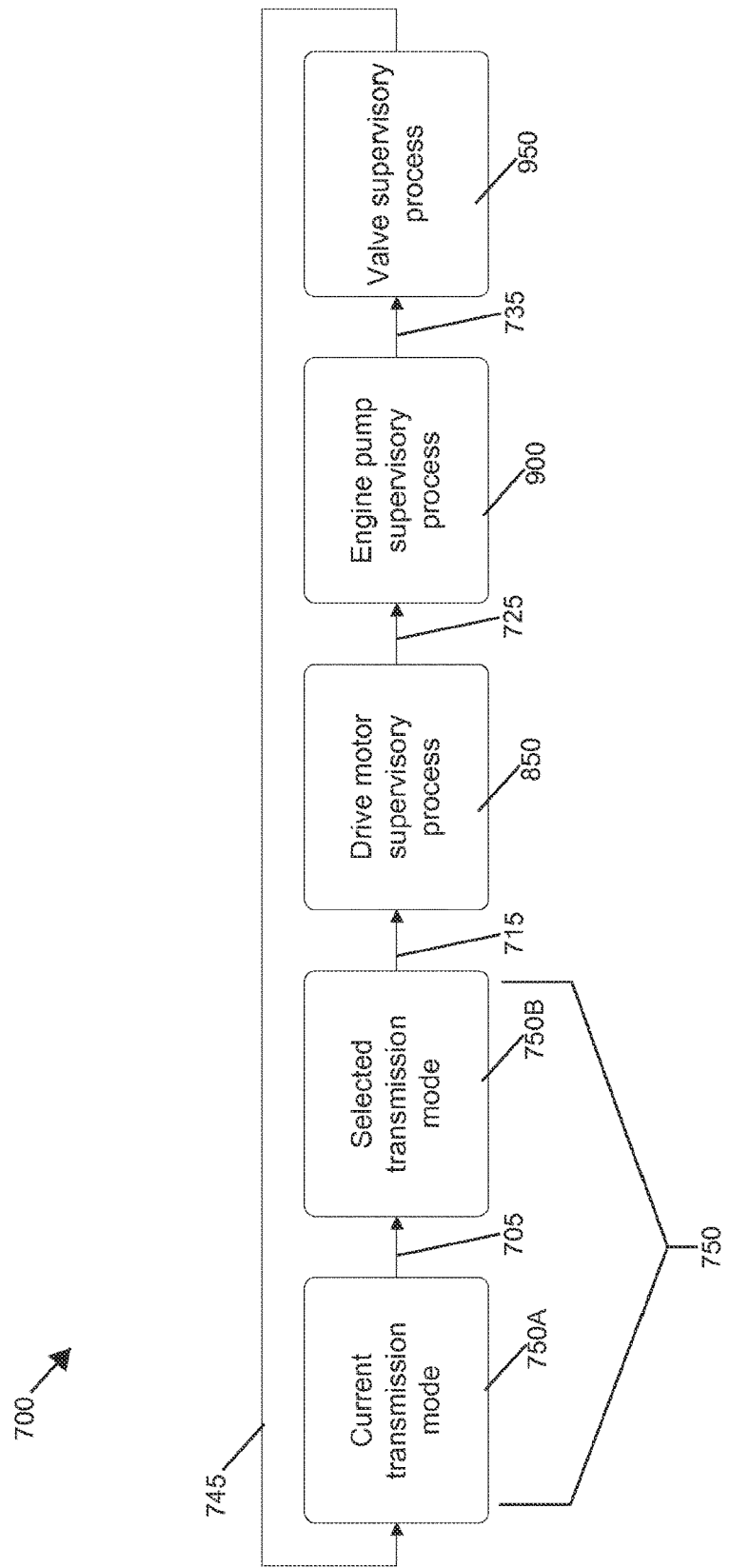
FIG. 12 is a supervisory flow chart including a transmission mode process, a drive motor supervisory process, an engine and pump supervisory process, and a valve supervisory process according to the principles of the present disclosure.

Turning now to FIG. 12, an example supervisory flow chart 700 is illustrated according to the principles of the present disclosure. In particular, the supervisory flow chart 700 includes a transmission mode process 750. As depicted, the transmission mode process 750 includes a current transmission mode process 750A and a selected transmission mode process 750B. A path 705 illustrates transferring from the current transmission mode process 750A to the selected transmission mode process 750B. The supervisory flow chart 700 further includes a drive motor supervisory process 850. A path 715 illustrates transferring from the transmission mode process 750 to the drive motor supervisory process 850. The supervisory flow chart 700 further includes an engine and pump supervisory process 900. A path 725 illustrates transferring from the drive motor supervisory process 850 to the engine and pump supervisory process 900. The supervisory flow chart 700 further includes a valve supervisory process 950. As depicted, a path 735 illustrates transferring from the engine and pump supervisory process 900 to the valve supervisory process 950. A path 745 also illustrates transferring from the valve supervisory process 950 to the transmission mode process 750.

Turning now to FIG. 13, an example flow chart illustrating the transmission mode process 750 is illustrated according to the principles of the present disclosure. The transmission mode flow chart 750 includes a current transmission mode process 750A and a selected transmission mode process 750B. The current transmission mode process 750A determines the current or existing state of the transmission. This determination is based on the known valve and actuator states and/or the commanded valve and actuator states if some or all of the valve position sensors are not available. The current transmission mode 654 is determined by what mode is currently being executed on a work machine 50. The current transmission mode process 750A is thereby a process used to calculate the current transmission mode 654. The selected transmission mode process 750B is a process used to select the next transmission mode state based on operator controlled parameters and the existing sensors, valves, and actuator states of the work machine 50. The transmission mode flow chart 750 includes a plurality of tests and evaluations to determine the current transmission mode 654 and the selected transmission mode 652.

A first test set 800 of the current transmission mode process 750A includes a test 802 to determine if the operator desires to accelerate or decelerate. The first test set 800 also includes a test 804 to determine if an accumulator isolation valve 210 is energized (i.e., open). The first test set 800 further includes a test 806 to determine if a previously selected transmission mode 652p is the hybrid propel mode 84. Logical values of results of each of the tests 802, 804, and 806 are ANDed at a logical AND 808. In particular, the output of each test 802, 804, and 806, etc. are all binary and combined at the AND gate 808 using Boolean logic.

The transmission mode flow chart 750 further includes a second test set 810. The second test set 810 includes a test 811 to determine if the operator desires to accelerate the work machine 50. The second test set 810 includes a test 812 to determine if a prime mover 104 (e.g., an engine) is "on" (i.e., running). The second test set 810 includes a test 813 to determine if the accumulator isolation valve 210 is de-energized (i.e., closed). The second test set 810 includes a test 814 to determine if a work circuit valve 206 (i.e., an engine pump on valve) is de-energized (i.e., closed). The second test set 810 includes a test 815 to determine if a main isolation valve 208 is de-energized (i.e., open). The second test set 810 includes a test 816 to determine if a displacement of a drive motor 108 (e.g., a pump/motor) has reached a maximum displacement. The second test set 810 includes a test 817 to determine if the previously selected transmission mode 652p is the hydrostatic mode 86. And, the second test set 810 includes a test 818 to determine if a hydrostatic mode enable variable has been set to "enabled". Logical values of results of each of the tests 811-818 are ANDed at a logical AND 819. In particular, the output of each test 811-818, etc. are all binary and combined at the AND gate 819 using Boolean logic.

The transmission mode flow chart 750 further includes a third set of tests 820. The third set of tests 820 includes a test 821 to determine if the current transmission mode 654 is the hybrid propel mode 84. The third test set 820 includes a test 822 to determine if a target pressure of the pump/motor 102 is greater than a hydrostatic entry pressure. The target pressure refers to the desired pressure that pump/motor 108 and pump/motor 102 should be operating at in order to achieve the operator commands. The hydrostatic entry pressure is a calibration that the target pressure needs to exceed in order to prevent the system from entering hydrostatic mode 86 at too low of a command. The hydrostatic entry pressure sets the minimum threshold of target pressure to enter the hydrostatic mode 86. The third test set 820 includes a test 823 to determine if the pressure target of the pump/motor 102 is greater than a current pressure of an accumulator 116. The third test set 820 includes a test 824 to determine if an accelerator pedal percentage of full scale activation is greater than a threshold percentage for requesting entry to the hydrostatic mode 86. The third test set 820 includes a test 825 to determine if the hydrostatic mode 86 is enabled. The tests 818 and 825 may be combined in certain embodiments. The third test set 820 includes a test 826 to determine if a flow demand of a work circuit 300 is less than a hydrostatic entry flow. The hydrostatic entry flow is a calibration or preset constant value that prevents hydrostatic mode entry if too much work circuit flow demand is present (e.g., if work circuit flow demand exceeds a predetermined value). The third test set 820 includes a test 827 to determine if a current speed of the work machine 50 is less than a maximum hydrostatic entry speed. The third test set 820 includes a test 828 to determine if vehicle hot shift is not preventing entry to the hydrostatic mode 86. Hot shift is changing the forward-neutral-reverse switch (i.e., the FNR switch) direction intent to the opposite of the current direction of travel. In other words, putting the work machine 50 in reverse while traveling forward and vice-a-versa. And, the third test set 820 includes a test 829 to determine if a conditional timer has expired. A conditional timer means that the conditional tests 822-827 must be true for a predetermined time before test 829 will become true. The test 829 prevents signal noise from making (i.e., causing) a switch to a new state. Logical values of results of each of the tests 821-829 are logically ANDed at a logical AND 831. In particular, the output of each test 821-829, etc. are all binary and combined at the AND gate 831 using Boolean logic.

The transmission mode flow chart 750 includes a fourth set of tests 833. The fourth set of tests 833 includes a first subset of tests 834 and a second subset of tests 835. The first subset of tests 834 includes a test 836 to determine if the current transmission mode 654 is the hydrostatic mode 86. The first subset of tests 834 includes a test 837 to determine if the pressure target of the pump/motor 108 is less than the current pressure of the accumulator 116. The target pressure refers to the desired pressure that pump/motor 108 and pump/motor 102 should be operating at in order to achieve the operator commands. The first subset of tests 834 includes a test 838 to determine if the accelerator pedal percentage of full scale activation is less than a threshold hydrostatic exit percentage. The first subset of tests 834 includes a test 839 to determine if the operator desires the work machine 50 to decelerate. The first subset of tests 834 includes a test 840 to determine if the operator desires the work machine 50 to be in neutral. The first subset of tests 834 includes a test 841 to determine if a state of the prime mover 104 is "off". And, the first subset of tests 834 includes a test 842 to determine if any faults are present in the control system 500. Logical values of results of each of the tests 836-842 are logically ORed at a logical OR 846. In particular, the output of each test 836-842, etc. are all binary and combined at the OR gate 846 using Boolean logic.

The second subset of tests 835 of the fourth set of tests 833 includes a test 843 that determines if a conditional timer has expired. A conditional timer means that the conditional tests 836-842 must be true for a predetermined time before test 843 will become true. The test 843 prevents signal noise from making (i.e., causing) a switch to a new state.

Logical values of results of each of the logical OR 846 and the results of the second subset of tests 835 are logically ANDed at a logical AND 848. In particular, the output of each of the OR gate 846 and the test 843, etc. are all binary and combined at the AND gate 848 using Boolean logic.

As illustrated at FIG. 13, the transmission mode flow chart 750 may start at a start position 752. As illustrated at FIG. 12, the path 745 is a portion of a loop of the supervisory flow chart 700. As illustrated at FIG. 13, the path 745 may begin at the start position 752 or may flow from a valve supervisory flow process 950. The path 745, in each case, brings control to a decision point 754 that determines if the AND output of the logical AND gate 808 is true (e.g., is a Boolean "1"). If the logical AND 808 is true, the current transmission mode 654 is the hybrid propel mode 84 and is registered as such at block 756. If the output of the logical AND gate 808 is not true (e.g., is a Boolean "0"), control advances to a decision point 758 that determines if the logical AND 819 is true. If the logical AND 819 is true, the current transmission mode 654 is the hydrostatic mode 86 and is registered as such at block 760. If the logical AND 819 is not true, the current transmission mode 654 remains as previously registered (i.e., does not change) at block 762. The results of either the block 756, the block 760, or the block 762 are transmitted as control passes along the path 705 from the current transmission mode process 750A of the transmission mode flow chart 750 to the selected transmission mode process 750B of the transmission mode flow chart 750.

The selected transmission mode process 750B of the transmission mode flow chart 750 receives the information from the current transmission mode process 750A. The results of the current transmission mode process 750A are carried along with results from the selected transmission mode process 750B. The path 705 brings control to a decision point 774 where the logical AND 831 is evaluated. If the logical AND 831 is true, the selected transmission mode 652 is the hydrostatic mode 86 and is set and registered as such at block 776. If the logical AND 831 is not true, control advances to a decision point 778 where the logical AND 848 is evaluated. If the logical AND 848 is true, the selected transmission mode 652 is the hybrid propel mode 84 and is set and registered as such at block 780. If the logical AND 848 is not true, the selected transmission mode 652 remains as the previously selected transmission mode 652p and is registered as such at block 782. The results of the current transmission mode process 750A and the selected transmission mode process 750B are transferred to the drive motor supervisory flow chart 850 along the path 715.

Figure 14:
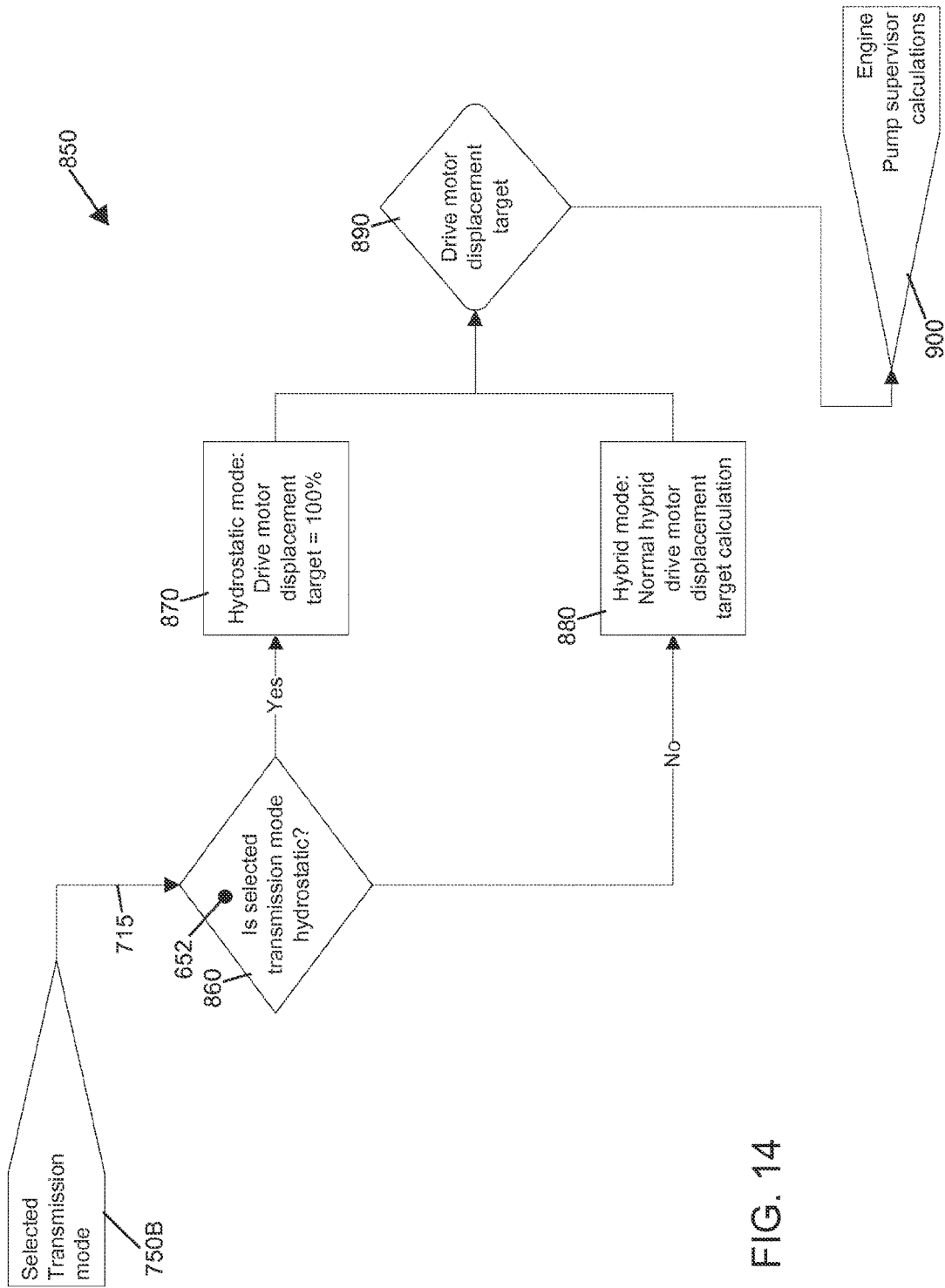
FIG. 14 is a drive motor supervisory flow chart suitable for use with the drive motor supervisory process of FIG. 12.

Turning now to FIG. 14, an example flow chart illustrating the drive motor supervisory process 850 is illustrated according to the principles of the present disclosure. The drive motor supervisory flow chart 850 begins at the selected transmission mode process 750B, and the path 715 transfers control to a decision point 860 that determines whether the selected transmission mode 652 is the hydrostatic mode 86. If the result is "yes", control is transferred to block 870, and a displacement of the drive motor 108 (i.e., the pump/motor) is set to 100%. If the selected transmission mode 652 is not the hydrostatic mode 86, control is transferred to block 880 where the displacement of the drive motor 108 is set according to a normal hybrid drive motor displacement target calculation. The drive motor displacement target is released to an electronic control unit 502 at step 890. Control then passes to the engine and pump supervisory process 900.

Figure 15:
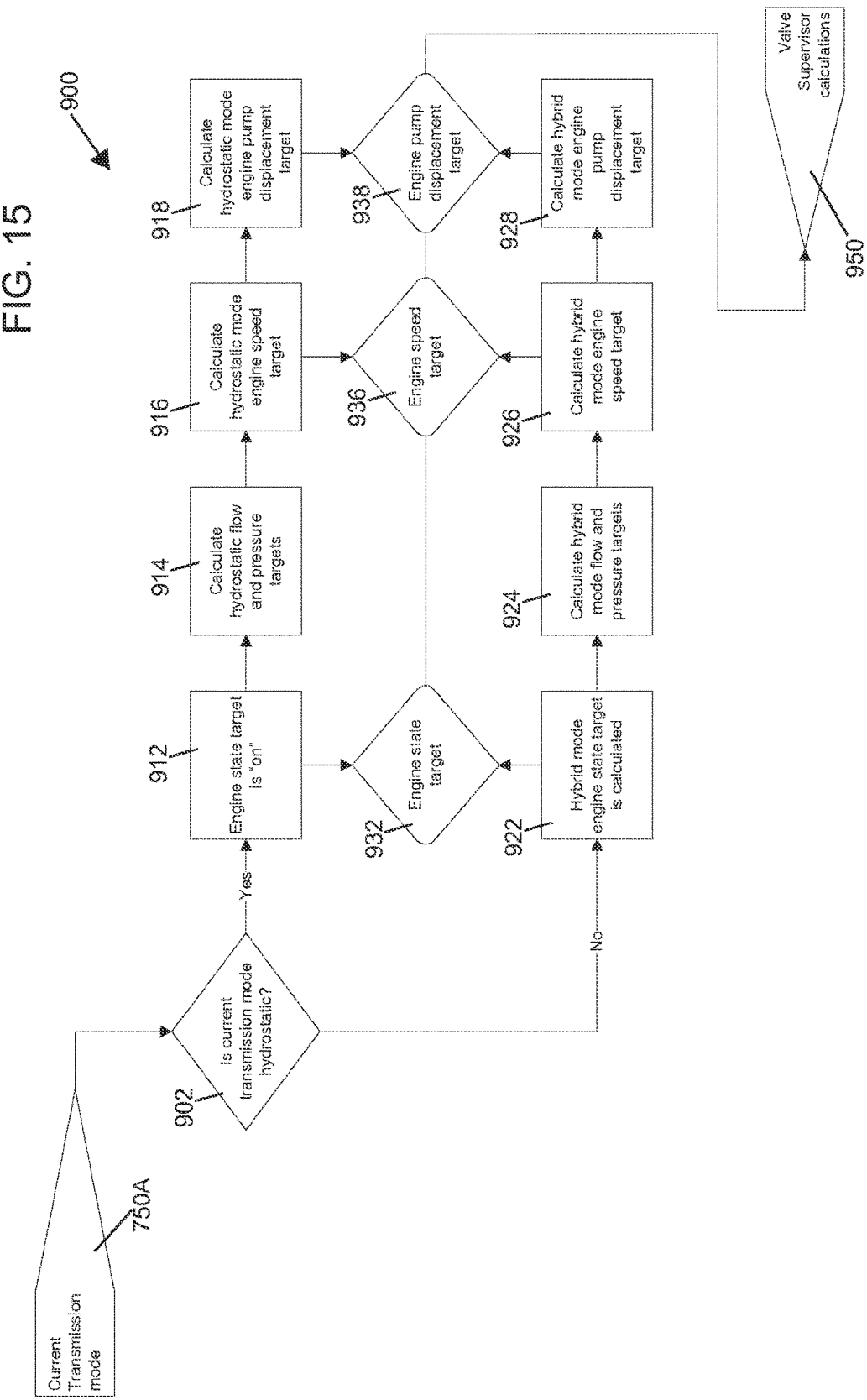
FIG. 15 is an engine and pump supervisory flow chart suitable for use with the engine and pump supervisory process of FIG. 12.

Turning now to FIG. 15, an example flow chart illustrating the engine and pump supervisory process 900 is illustrated according to the principles of the present disclosure. The engine and pump supervisory flow chart 900 begins at the current transmission mode process 750A. Control is transferred to a decision point 902 where the current transmission mode 654 is queried to see if it is set to the hydrostatic mode 86. If the result is "yes", control advances to block 912 where an engine state target is set to "on". The engine state target value of "on" is stored and released to the control system at step 932. Control then passes to block 914 where hydrostatic flow and pressure targets of the pump/motor 102, in cooperation with the prime mover 104, are calculated. Control then transfers to block 916 where a hydrostatic mode engine speed target is calculated. The engine speed target is stored and released to the control system at step 936. Control then passes to block 918 where a hydrostatic mode engine pump displacement target is calculated. The resulting engine pump displacement target is stored and released to the system at step 938. If the result of decision point 902 is "no", control is transferred to block 922 where a hybrid mode engine state target is calculated. The resulting engine state target is stored and released to the control system at the step 932. Control is then transferred to block 924 where hybrid mode flow and pressure targets of the pump/motor 102, in cooperation with the prime mover 104, are calculated. Control is then transferred to block 926 where a hybrid mode engine speed target is calculated. The resulting engine speed target is stored and released to the control system at the step 936. Control is then transferred to block 928 where a hybrid mode engine pump displacement target is calculated. The resulting engine pump displacement target is stored and released to the control system at the step 938. Upon the engine state target, the engine speed target, and the engine pump displacement target being calculated, control is passed to the valve supervisory process 950.

Turning now to FIG. 16, an example flow chart illustrating the valve supervisory process 950 is illustrated according to the principles of the present disclosure. The valve supervisory flow chart 950 begins at the selected transmission mode process 750B. The valve supervisory flow chart 950 includes a first set of tests 980 and a second set of tests 990. The first set of tests 980 include a test 981 that determines if the accumulator isolation valve 210 is energized (i.e., is open). The set of tests 980 includes a test 982 that determines if the selected transmission mode 652 is the hydrostatic mode 86. The set of tests 980 includes a test 983 that determines if a drive motor pressure rate of change is greater than zero. A pressure rate of change greater than zero indicates that the engine pump is providing more flow into the system than the motor, valves, and other hydraulic components are consuming. If the valve closes when this value is negative, the system may cavitate. The set of tests 980 includes a test 984 that determines if the engine speed target is greater than a minimum hydrostatic speed for the engine (i.e., the prime mover 104). The set of tests 980 includes a test 985 that determines if the engine speed status is greater than a minimum hydrostatic engine speed. And, the set of tests 980 includes a test 986 that determines if a hydraulic pressure at the drive motor 108 (i.e., the pump/motor) is greater than a current pressure at the hydraulic accumulator 116. Logical values of results of each of the tests 981-986 are ANDed and stored at a logical AND 987. In particular, the output of each test 981-986, etc. are all binary and combined at the AND gate 987 using Boolean logic.

The second set of tests 990 includes a first test 991 that determines if the accumulator isolation valve 210 is de-energized (i.e., closed). The second set of tests 990 includes a test 992 that determines if the current pressure at the drive motor 108 is below a minimum hydrostatic mode entry pressure. And, the second set of tests 990 includes a test 993 that determines if the prime mover 104 (e.g., the engine) is "off". Logical values of results of each of the tests 991-993 are ORed and stored at a logical OR 994. In particular, the output of each test 991-993, etc. are all binary and combined at the OR gate 994 using Boolean logic.

Upon control entering the valve supervisory flow chart 950, a decision point 952 evaluates whether the logical AND 987 is true. If the logical AND 987 is true, control passes to block 954 where the accumulator isolation valve 210 is closed (i.e., de-energize). If the logical value of the AND 987 is not true, control passes to decision point 956 where the logical OR 994 is evaluated. If the logical value of the OR 994 is "true", control passes to block 958 where the accumulator isolation valve 210 is opened (i.e., energized). If the logical value of the OR 994 is not true, control is transferred to block 960 where a current state of the accumulator isolation valve 210 is maintained. Upon the valve supervisory flow chart 950 being completed, control is passed along path 745 to the transmission mode process 750.

Figure 9:
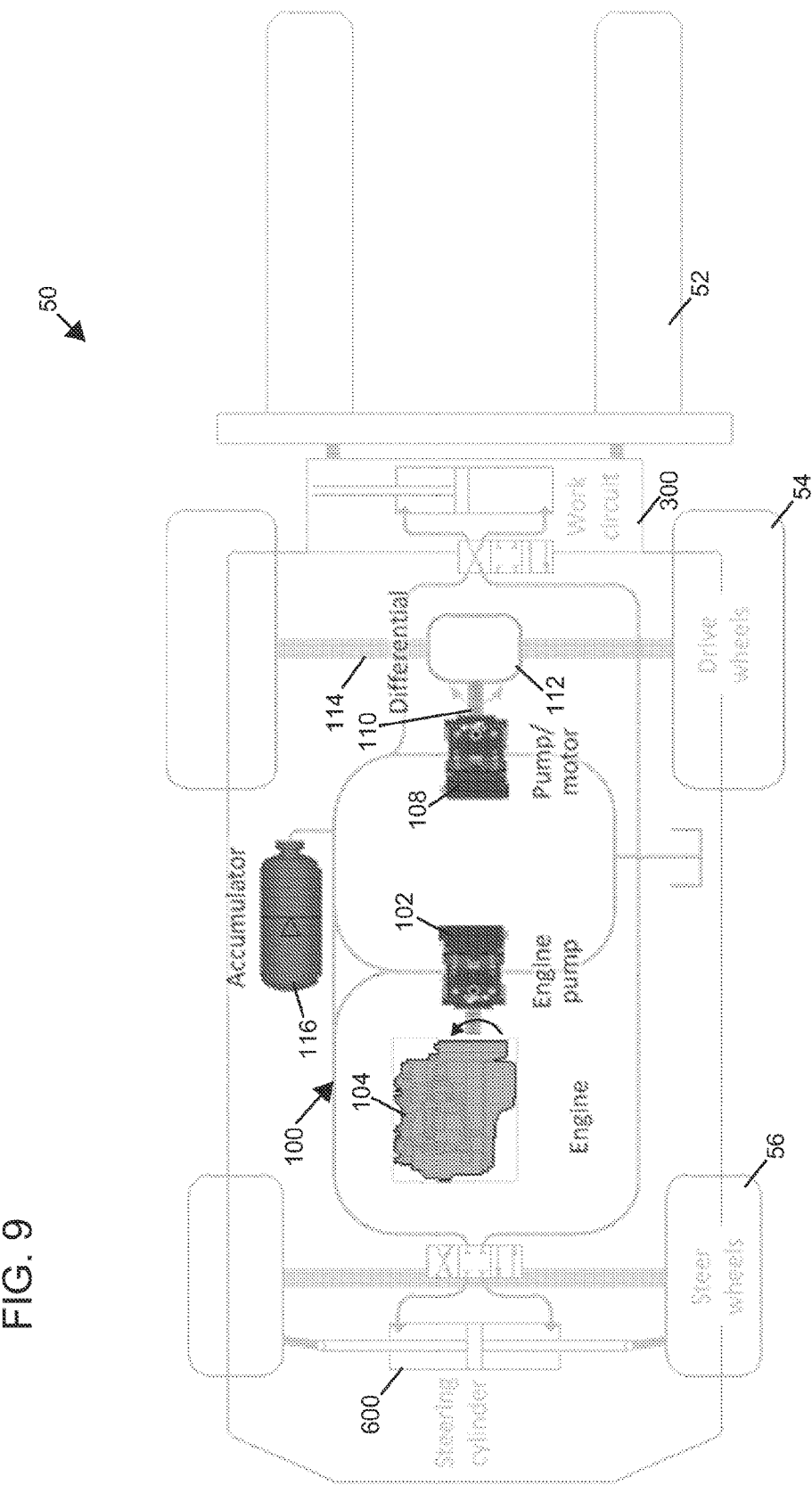
FIG. 9 is a schematic top plan view of a work vehicle including the hydraulic system of FIG. 1 or 8 according to the principles of the present disclosure.

According to the principles of the present disclosure and as illustrated at FIGS. 1-7, a hydraulic system 100 (i.e., a hydraulic circuit architecture) is adapted to power the drivetrain 114 of the work machine 50 (i.e., a work vehicle, a mobile work vehicle, a forklift, a lift truck, a fork truck, a wheel loader, a digger, an excavator, a backhoe loader, etc.). The hydraulic system 100 may be further adapted to power a work circuit 300 of the work machine 50. The hydraulic system 100 may be adapted to power a steering control unit 600 (e.g., a hydraulic steering circuit) of the work machine 50. As depicted at FIG. 9, the work machine 50 includes a work attachment 52 (e.g., the fork, a work component, etc.), at least one drive wheel 54, and at least one steer wheel 56. In certain embodiments, one or more drive wheel 54 may be combined with one or more steer wheel 56. In certain embodiments, the work machine 50 may include only a single drive hydraulic pump.

The hydraulic system 100 is adapted to recover energy and store the energy in a hydraulic accumulator 116 for reuse. For example, when the work machine 50 is decelerated, the drivetrain 114 may deliver kinetic energy to the hydraulic system 100 and thereby store the energy in the hydraulic accumulator 116. The hydraulic system 100 is also adapted to quickly start a prime mover 104 (e.g., the internal combustion engine) of the work machine 50 with the energy stored in the hydraulic accumulator 116. The hydraulic system 100 may be adapted to power the drivetrain 114, the work circuit 300, and/or the steering control unit 600 without the prime mover 104 running by drawing hydraulic power from the hydraulic accumulator 116. In certain embodiments, the prime mover 104 may drive only a single hydraulic pump. In certain embodiments, the prime mover 104 may drive only a single hydraulic pump that powers the drivetrain 114 and the work circuit 300. In certain embodiments, the prime mover 104 may drive only a single hydraulic pump that powers at least the drivetrain 114 and the work circuit 300. In certain embodiments, the prime mover 104 may drive only a single hydraulic pump that powers the drivetrain 114, the work circuit 300, and the steering control unit 600. In certain embodiments, the prime mover 104 may drive only a single hydraulic pump that at least powers the drivetrain 114, the work circuit 300, and the steering control unit 600.

Figure 2:
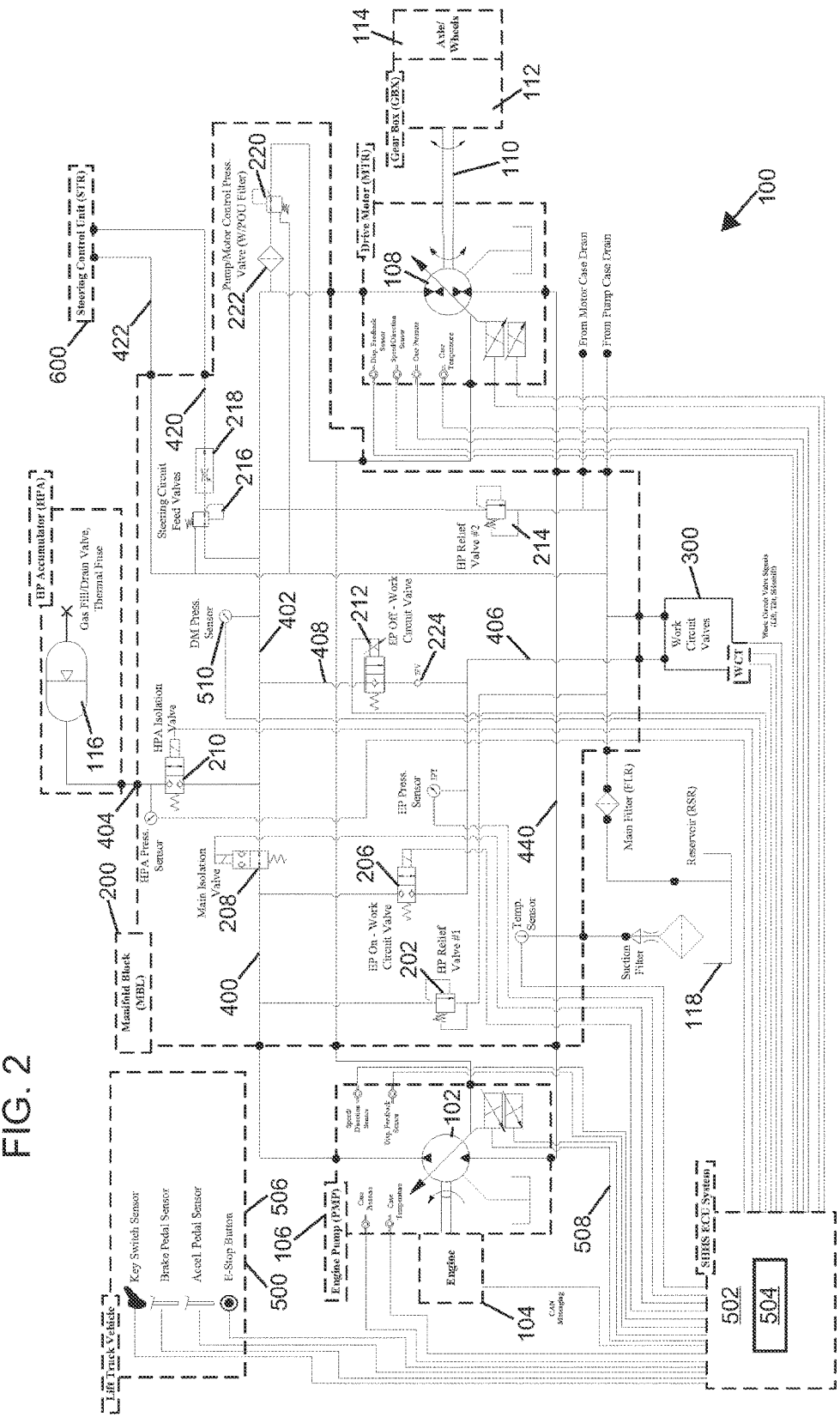
FIG. 2 is a schematic diagram of the hydraulic system of FIG. 1 further illustrating a control system of the hydraulic system.
Figure 3:
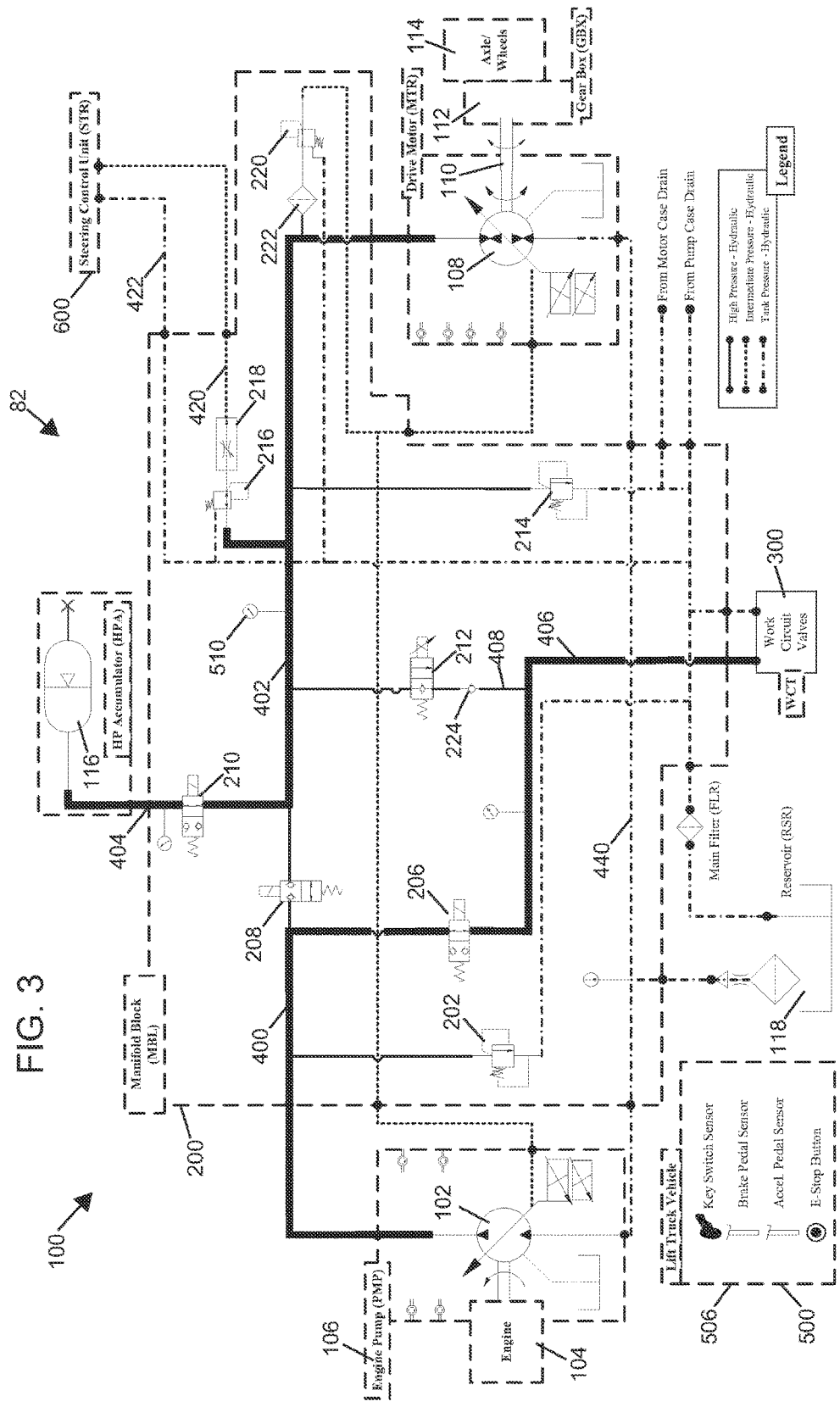
FIG. 3 is the schematic diagram of FIG. 1 further illustrating a first mode of the hydraulic system.
Figure 4:
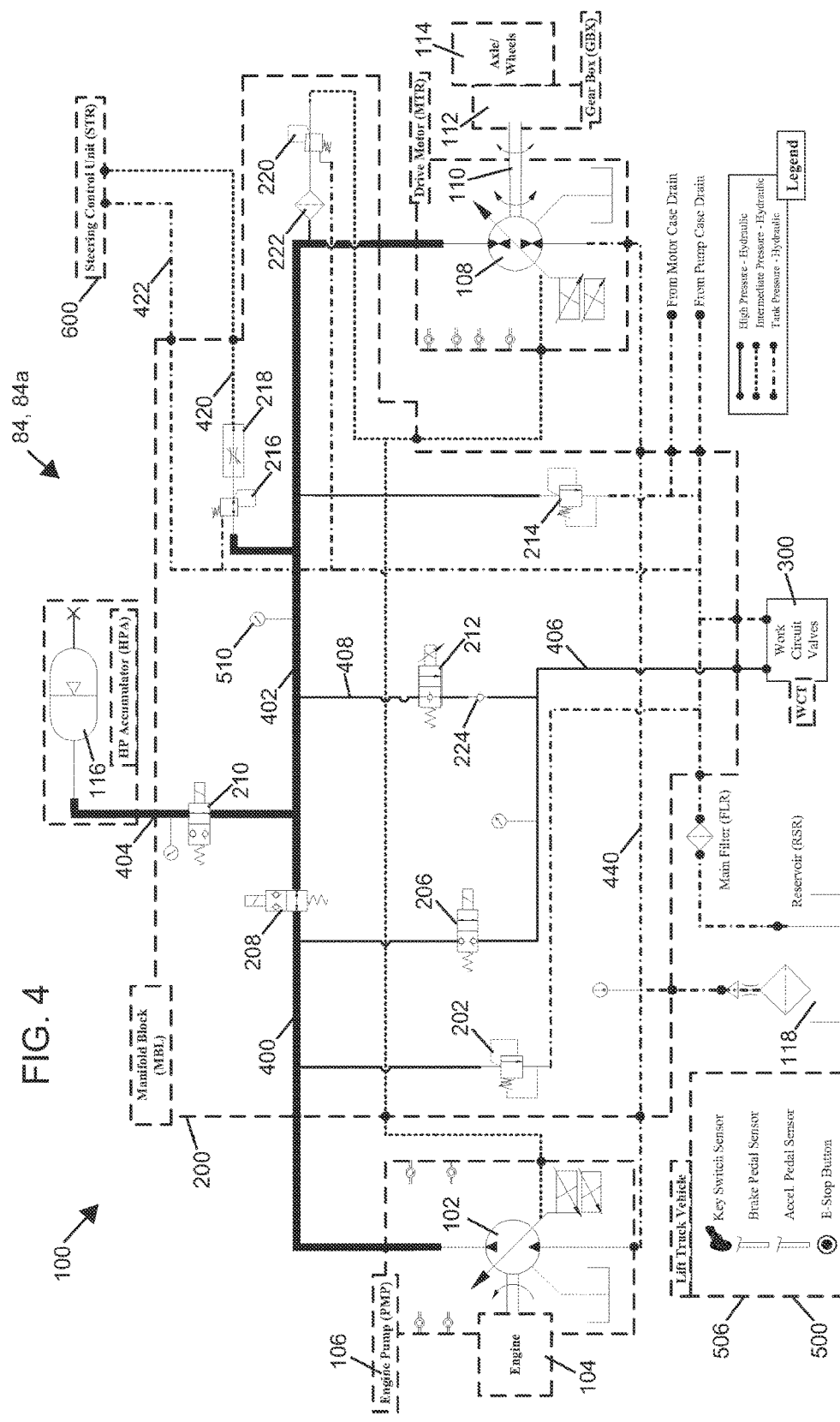
FIG. 4 is the schematic diagram of FIG. 1 further illustrating a second mode of the hydraulic system.
Figure 5:
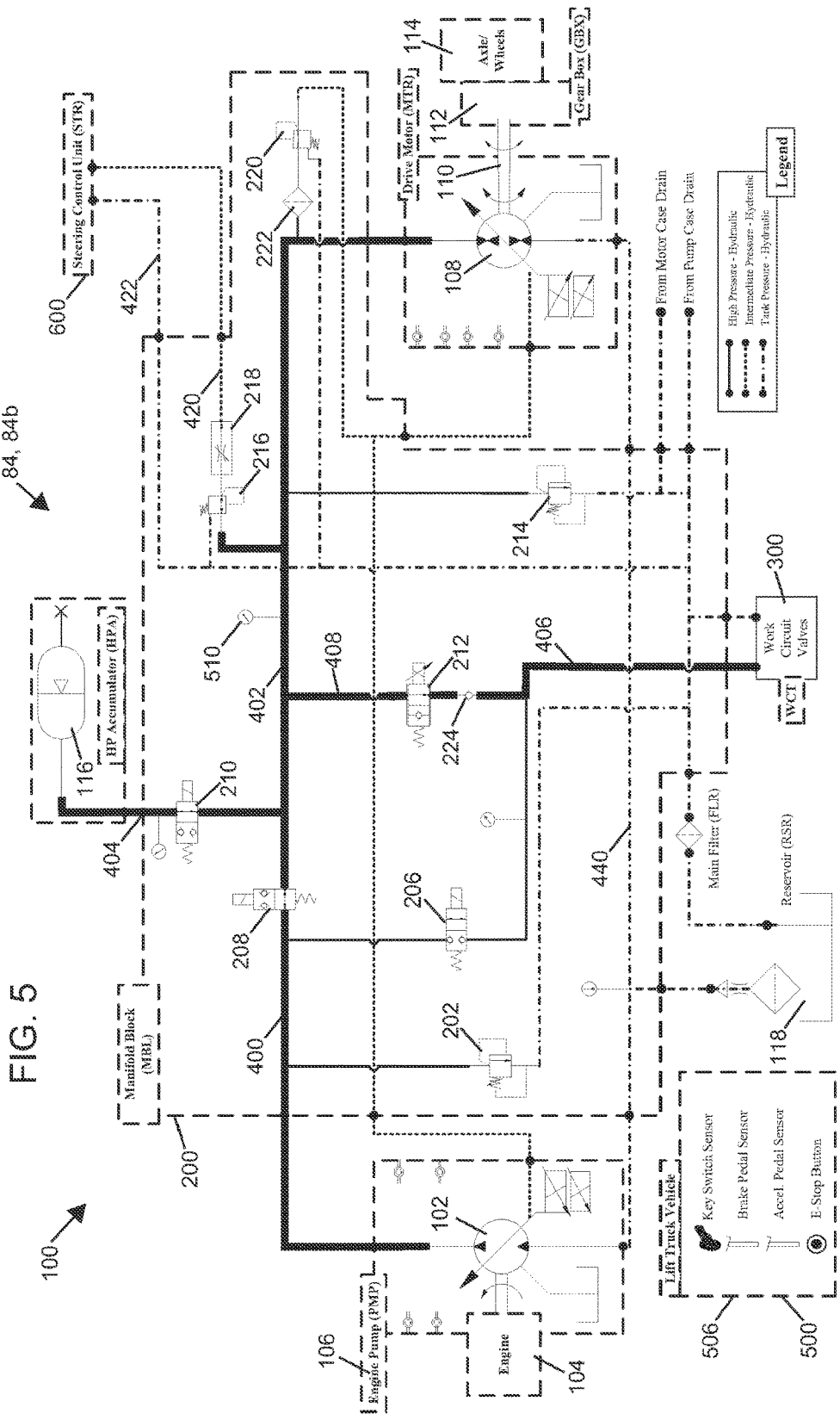
FIG. 5 is the schematic diagram of FIG. 1 further illustrating a third mode of the hydraulic system.
Figure 6:
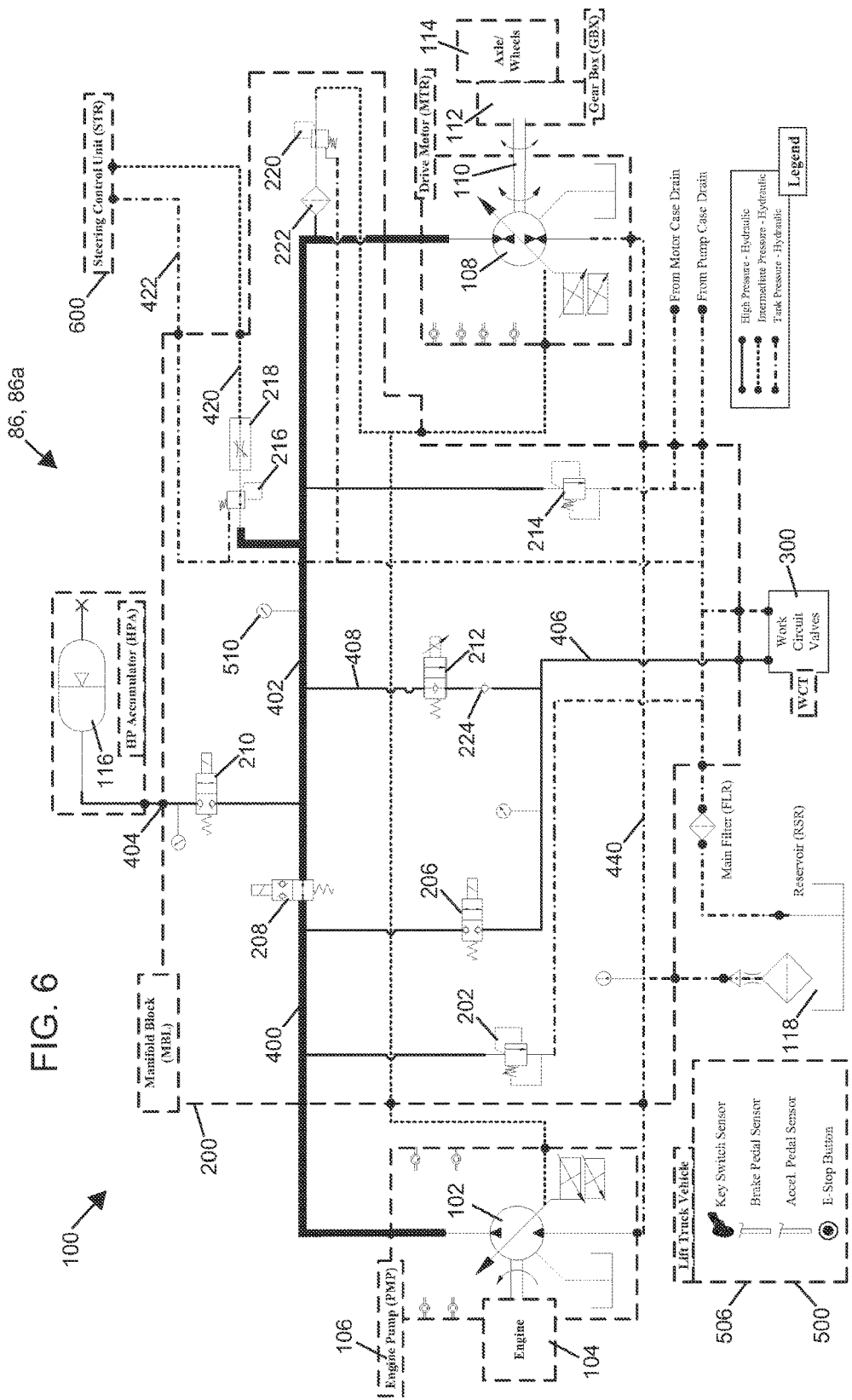
FIG. 6 is the schematic diagram of FIG. 1 further illustrating a fourth mode of the hydraulic system.
Figure 7:
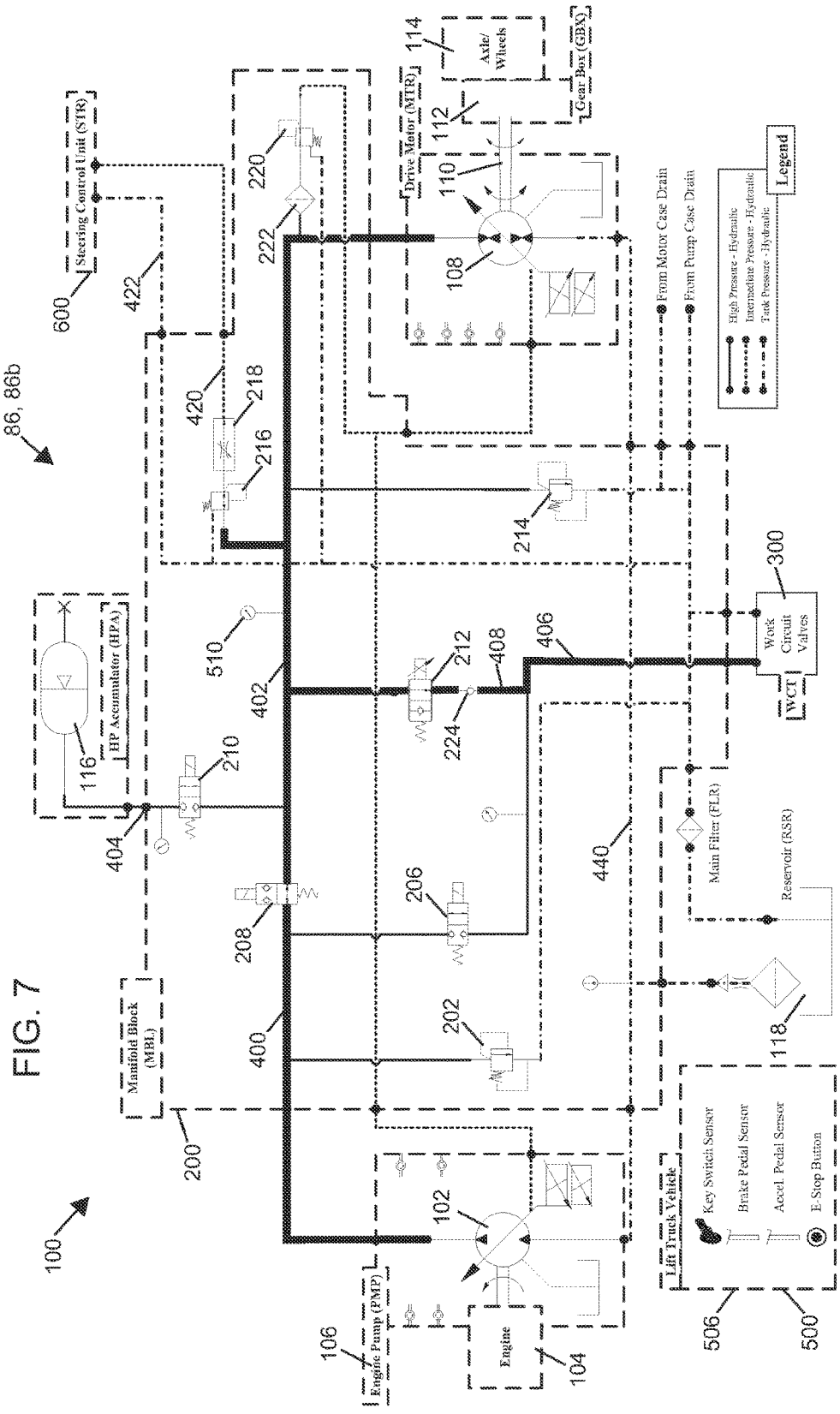
FIG. 7 is the schematic diagram of FIG. 1 further illustrating a fifth mode of the hydraulic system.

The hydraulic system 100 operates in various modes depending on demands placed on the work machine 50 (e.g., by an operator). A control system 500 monitors an operator interface 506 of the work machine 50 and also monitors various sensors 510 and operating parameters of the hydraulic system 100. As illustrated at FIG. 2, signal lines 508 may facilitate communication within the control system 500. The control system 500 evaluates input received from the operator interface 506. In certain embodiments, an electronic control unit 502 monitors the various sensors 510 and operating parameters of the hydraulic system 100 to configure the hydraulic system 100 into the most appropriate mode. The modes include a work circuit primary mode 82, as illustrated at FIG. 3; the hybrid propel mode 84, as illustrated at FIGS. 4 and 5, and a hydrostatic mode 86, as illustrated at FIGS. 6 and 7. The electronic control unit 502 may monitor the operator interface 506, the prime mover 104, and environmental conditions (e.g. ambient temperature). Memory 504 (e.g., RAM memory) may be used within the electronic control unit 502 to store executable code, the operating parameters, the input from the operator interface, etc.

In the work circuit primary mode 82 (see FIG. 3), power from the prime mover 104 is directly supplied to the work circuit 300 by the hydraulic system 100, and power from the hydraulic accumulator 116 is delivered to the drivetrain 114 by the hydraulic system 100. In certain embodiments, power for the steering control unit 600 is also taken from the hydraulic accumulator 116 in the work circuit primary mode 82. The work circuit primary mode 82 may be selected when power demands by the drivetrain 114 are low, relatively low, and/or are anticipated to be low, and power demands and/or hydraulic flow demands by the work circuit 300 are high, relatively high, and/or are anticipated to be high. Such conditions may occur, for example, when the work machine 50 is moving slowly or is stationary and the work attachment 52 is being used extensively and/or with high loading. In the work circuit primary mode 82, the steering control unit 600 may receive power from the hydraulic accumulator 116.

The hybrid propel mode 84 (see FIGS. 4 and 5) may be used when the power demand from the drivetrain 114 is dominate over the power demand of the work circuit 300. The hybrid propel mode 84 may also be used when it is desired to recapture energy from the deceleration of the work machine 50. The hybrid propel mode 84 may further be used to power the work machine 50 without the prime mover 104 running or running full time. For example, the hybrid propel mode 84 allows the prime mover 104 to be shut down upon sufficient pressure existing in the hydraulic accumulator 116. Upon depletion of the hydraulic accumulator 116 to a lower pressure, the hybrid propel mode 84 hydraulically restarts the prime mover 104 thereby recharging the hydraulic accumulator 116 and also providing power to the work machine 50 from the prime mover 104. In the hybrid propel mode 84, the steering control unit 600 may receive power from the hydraulic accumulator 116 and/or the prime mover 104.

The hydrostatic mode 86 (see FIGS. 6 and 7) may be used when the demands of the drivetrain 114 are high, relatively high, and/or are anticipated to be high. For example, when the work machine 50 is driven at a high speed, when the work machine 50 is driven up an incline, and/or when the drivetrain 114 is under a high load. The hydrostatic mode 86 may be used when the demands of the drivetrain 114 are sufficiently high to require a pressure within the hydraulic accumulator 116 to be in excess of a pressure rating and/or a working pressure of the hydraulic accumulator 116. The pressure rating and/or the working pressure of the hydraulic accumulator 116 can correspondingly be lowered in a hydraulic system that can switch between a mode (e.g., the hydrostatic mode 86) where the hydraulic accumulator 116 is isolated and a mode (e.g., the hybrid propel mode 84) where the hydraulic accumulator 116 is connected. In the hydrostatic mode 86, the steering control unit 600 may receive power from the prime mover 104.

The control system 500 may rapidly switch between the work circuit primary mode 82, the hybrid propel mode 84, and/or the hydrostatic mode 86 to continuously adjust the hydraulic system 100 to the demands of the work machine 50.

Turning now to FIG. 1, the hydraulic system 100 is illustrated as a schematic diagram. The hydraulic system 100 is powered by the prime mover 104 which is connected to a pump/motor 102. In certain embodiments, the pump/motor 102 may be replaced with a pump. As depicted, the hydraulic system 100 allows the hydraulic pump/motor 102 to be a single pump/motor (or a single pump) that powers the drivetrain 114, the work circuit 300, and/or the steering control unit 600. By configuring the hydraulic system 100 with the single pump/motor (or the single pump), a cost of the hydraulic system 100 may be reduced, a weight of the hydraulic system 100 may be reduced, the efficiency of the hydraulic system 100 may be increased by reducing the parasitic losses of additional components, and/or a packaging size of the hydraulic system 100 may be reduced.

As depicted, the hydraulic pump/motor 102 and the prime mover 104 may be assembled into an engine pump assembly 106. In certain embodiments, the prime mover 104 turns in a single rotational direction (e.g., a clockwise direction), and thus, the hydraulic pump/motor 102 may also rotate in the single rotational direction of the prime mover 104. Power may be transferred between the hydraulic pump/motor 102 and the prime mover 104 by a shaft (e.g., an input/output shaft of the hydraulic pump/motor 102 may be connected to a crankshaft of the prime mover 104). The power is typically transferred from the prime mover 104 to the hydraulic pump/motor 102 when the hydraulic pump/motor 102 is supplying hydraulic power to the hydraulic accumulator 116, the drivetrain 114, the work circuit 300, and/or the steering control unit 600. The power may be transferred from the hydraulic pump/motor 102 to the prime mover 104 when the hydraulic pump/motor 102 is starting the prime mover 104, during engine braking, etc.

The hydraulic pump/motor 102 may be a variable displacement pump/motor. The hydraulic pump/motor 102 may be an over-center pump/motor. The hydraulic pump/motor 102 includes an inlet 102l (i.e., a low pressure side) that receives hydraulic fluid from a tank 118 via a low pressure line 440, and the hydraulic pump/motor 102 includes an outlet 102h (i.e., a high pressure side) that is connected to a high pressure line 400 of the hydraulic pump/motor 102.

When the prime mover 104 supplies power to the hydraulic pump/motor 102, hydraulic fluid is drawn from the tank 118 into the inlet 102l of the hydraulic pump/motor 102 and expelled from the outlet 102h of the hydraulic pump/motor 102 at a higher pressure. In certain embodiments, power may be delivered from the hydraulic pump/motor 102 to the prime mover 104 when a swash plate of the hydraulic pump/motor 102 is positioned over center and high pressure hydraulic fluid from the high pressure line 400 is driven backwards through the hydraulic pump/motor 102 and ejected to the low pressure line 440 and to the tank 118. Alternatively, as illustrated at FIG. 8, a reversing valve 103 of a hydraulic system 100' can be used to cause the prime mover 104 to be backdriven with a hydraulic pump/motor 102', similar to the hydraulic pump/motor 102.

A flow control device 202 (e.g., a relief valve) includes a connection to the high pressure line 400. Upon hydraulic fluid pressure within the high pressure line 400 reaching a predetermined limit, the flow control device 202 opens and dumps a portion of the hydraulic fluid to the tank 118 and thereby protecting the high pressure line 400 from reaching an over pressure condition.

A flow control device 206 is connected between the high pressure line 400 and a high pressure line 406 of the work circuit 300. In the depicted embodiment, the flow control device 206 is a work circuit valve.

A flow control device 208 is connected between the high pressure line 400 and a high pressure line 402. As depicted, the high pressure line 402 may be connected to an inlet 108h (i.e., a high pressure side) of a pump/motor 108. The flow control device 208 may be an isolation valve. In certain embodiments, the flow control device 206 and the flow control device 208 may be combined into a single three-way valve 207 (see FIG. 8).

The high pressure line 402 is connected to the hydraulic accumulator 116 by a fluid flow control device 210. In the depicted embodiment, the fluid flow control device 210 is an isolation valve for the hydraulic accumulator 116. In the depicted embodiment, the fluid flow control device 210 and the hydraulic accumulator 116 are connected by an accumulator line 404.

The high pressure line 402 is further connected to the high pressure line 406 by a flow control device 212 and another flow control device 224. In the depicted embodiment, the flow control device 212 is a Valvistor® proportional flow control device, and the flow control device 224 is a check valve that prevents hydraulic fluid from the high pressure line 406 from entering the high pressure line 402. In the depicted embodiment, the flow control devices 212 and 224 are connected in series along a cross-over flow line 408 that connects the high pressure line 402 and the high pressure line 406. In other embodiments, a single flow control device may be used along the cross-over flow line 408.

Certain aspects of the propulsion system of the work machine 50 will now be described. The propulsion system includes the pump/motor 108 that both transmits and receives power to and from the drivetrain 114 via an output shaft 110. In particular, the output shaft 110 is connected to a gear box 112. As illustrated at FIG. 9, the gear box 112 may include a differential connected to a pair of the drive wheels 54. In other embodiments, a hydraulic pump/motor may be included at each of the drive wheels 54, and the differential may not be used. When sending power to the drivetrain 114, the pump/motor 108 may accelerate the work machine 50, may move the work machine 50 up an incline, and/or may otherwise provide overall movement to the work machine 50. When the work machine 50 decelerates and/or travels down an incline, the pump/motor 108 may receive energy from the drivetrain 114. When the hydraulic system 100 is in the hybrid propel mode 84 or the work circuit primary mode 82, the pump/motor 108 may send hydraulic energy to the hydraulic accumulator 116. In particular, the pump/motor 108 may receive hydraulic fluid from the tank 118 via the low pressure line 440 and pressurize the hydraulic fluid and send it through the high pressure line 402 through the fluid flow control device 210 and the accumulator line 404 and into the hydraulic accumulator 116.

The pump/motor 108 may be driven by hydraulic power from the hydraulic accumulator 116 or the hydraulic pump/motor 102. In particular, when the hydraulic system 100 is in the work circuit primary mode 82, the pump/motor 108 receives the hydraulic power from the hydraulic accumulator 116, as illustrated at FIG. 3. When the hydraulic system 100 is in the hybrid propel mode 84, as illustrated at FIGS. 4 and 5, the pump/motor 108 may receive hydraulic power from either the hydraulic pump/motor 102, the hydraulic accumulator 116, or both the hydraulic pump/motor 102 and the hydraulic accumulator 116. When the hydraulic system 100 is in the hydrostatic mode 86, as illustrated at FIGS. 6 and 7, the pump/motor 108 receives power from the hydraulic pump/motor 102. However, the pump/motor 108 may deliver power to the hydraulic pump/motor 102 and the prime mover 104 may thereby provide engine braking.

A relief valve 214 may be connected between the high pressure line 402 and the tank 118. Feedback from the high pressure line 402 may be given to the hydraulic pump/motor 102 by way of a pump/motor control pressure valve 220 (e.g. a pressure reducing valve). In particular, a point of use filter device 222 is connected between the high pressure line 402 and the pump/motor control pressure valve 220. The pump/motor control pressure valve 220 may feed a pressure signal to the hydraulic pump/motor 102 and thereby control the hydraulic pump/motor 102 in certain embodiments and/or in certain modes.

In the depicted embodiment, the steering control unit 600 receives hydraulic power from the high pressure line 402. In particular, an intermediate pressure steering line 420 is connected to the high pressure line 402 via a steering feed valve 218 (e.g., a flow control valve) and a steering feed valve 216 (e.g., a pressure reducing valve). A return line 422 is connected between the steering control unit 600 and the tank 118.

Various components may be included in a manifold block 200. For example, the flow control device 202, the flow control device 206, the flow control device 208, the fluid flow control device 210, the flow control device 212, the relief valve 214, the pump/motor control pressure valve 220, the device 222, and/or the flow control device 224 may be included in the manifold block 200.

Turning now to FIG. 2, a schematic diagram of the control system 500 is shown with a schematic diagram of the hydraulic system 100. As can be seen, the hydraulic system 100 monitors a plurality of sensors indicating the state of the hydraulic system 100. The control system 500 further monitors the operator interface 506 thereby allowing an operator to take control of the hydraulic system 100 and thereby take control of the work machine 50. The electronic control unit 502 of the control system 500 may perform calculations that model the hydraulic system 100 in the various modes and thereby determine the optimal mode and thereby select the optimal mode for the given working conditions and the given operator input. Under certain conditions, the mode of the hydraulic system 100 is selected to maximize fuel efficiency of the work machine 50. In other conditions, the mode of the hydraulic system 100 is selected to maximize performance of the hydraulic system 100 and thereby the work machine 50. The electronic control unit 502 may learn a working cycle that the work machine 50 repeatedly undertakes. By learning the working cycle, the electronic control unit 502 can maximize efficiency for the working cycle and identify when the work machine 50 is in the working cycle. The electronic control unit 502 may switch modes differently depending on which working cycle the work machine 50 is in. By switching modes throughout the working cycle, various parameters of the hydraulic system 100 can be optimized for efficiency or performance. For example, charge pressure of the hydraulic accumulator 116, swash plate angle of the hydraulic pump/motor 102 and/or the pump/motor 108, and/or the timing of starting and stopping the prime mover 104 may be determined based on the working cycle of the work machine 50. The control system 500 may emulate a conventional work machine such that the work machine 50 behaves and feels like the conventional work machine to the operator.

Turning now to FIG. 3, the work circuit primary mode 82 is illustrated. The work circuit primary mode 82 is selected by the control system 500 when the work attachment 52 is under heavy use, sustained use, and/or use that requires high volumetric flow rates of hydraulic fluid. The drivetrain 114 of the work machine 50 is operational in the work circuit primary mode 82. In particular, the hydraulic accumulator 116 can supply power to and receive power from the pump/motor 108. Upon the hydraulic accumulator 116 being depleted to a given level, the control system 500 may quickly switch the hydraulic system 100 into the hybrid propel mode 84 to recharge the hydraulic accumulator 116. Upon the hydraulic accumulator 116 being recharged to a given pressure level, the control system 500 may return the hydraulic system 100 to the work circuit primary mode 82.

Turning now to FIG. 4, the hybrid propel mode 84 is illustrated. In particular, a hybrid mode 84a is illustrated. The hybrid mode 84a allows the exchange of energy between the hydraulic pump/motor 102, the hydraulic accumulator 116, and the pump/motor 108. In particular, the hydraulic pump/motor 102 may supply hydraulic power to the hydraulic accumulator 116 for the purpose of recharging the hydraulic accumulator 116. The hydraulic pump/motor 102 may separately or simultaneously supply power to the pump/motor 108 to propel the work machine 50. The hydraulic accumulator 116 may supply power to the hydraulic pump/motor 102 for the purpose of starting the prime mover 104. Separately or simultaneously, the hydraulic accumulator 116 may supply power to the pump/motor 108 to propel the work machine 50. The pump/motor 108 may supply hydraulic fluid power to the hydraulic accumulator 116 and thereby charge the hydraulic accumulator 116. Separately or simultaneously, the pump/motor 108 may provide power to the hydraulic pump/motor 102. The power supply to the hydraulic pump/motor 102 can be used to start the prime mover 104 and/or to provide engine braking (e.g., upon the hydraulic accumulator 116 being full). When the hydraulic system 100 is in the hybrid mode 84a, the work circuit 300 may be cut off from hydraulic fluid power. In this case, the work circuit 300 may have no demand for hydraulic power.

Turning now to FIG. 5, the hybrid propel mode 84 is again illustrated. In particular, a hybrid mode 84b is illustrated. The hybrid mode 84b is similar to the hybrid mode 84a except that the cross-over flow line 408 is open allowing hydraulic fluid power from the high pressure line 402 to be supplied to the work circuit 300. In the hybrid mode 84b, the hydraulic pump/motor 102, the hydraulic accumulator 116, and/or the pump/motor 108 may supply hydraulic power to the work circuit 300.

The hybrid propel mode 84 may be preferred when the work machine 50 is undergoing a moderate workload, and/or when high efficiency and/or energy recovery from the drivetrain 114 is desired.

Turning now to FIG. 6, the hydrostatic mode 86 is illustrated. In particular a hydrostatic mode 86a is illustrated. The hydrostatic mode 86a may be used when the drivetrain 114 of the work machine 50 is under heavy load. For example, when the work machine 50 is driven at high torque/power and/or when the work machine 50 is driven up an incline. When the hydraulic system 100 is operated in the hydrostatic mode 86a, hydraulic pressure within the high pressure line 400 and the high pressure line 402 may exceed a working pressure and/or a rated pressure of the hydraulic accumulator 116. By switching between the hybrid propel mode 84 and the hydrostatic mode 86, the hydraulic system 100 may undertake tasks that result in high pressures in the high pressure line 402 without exposing the hydraulic accumulator 116 to the high pressures. Thus, the benefits of the hybrid propel mode 84 can be enjoyed without requiring that the accumulator 116 have a pressure rating that matches the maximum pressure rating of the hydraulic pump/motor 102. By bypassing (e.g., isolating) the accumulator 116 with the fluid flow control device 210, the hydraulic system 100 does not need to wait for the accumulator 116 to be pressurized up to the desired working pressure. When the hydraulic system 100 is in the hydrostatic mode 86a, the work circuit 300 may be cut off from hydraulic fluid power. In this case, the work circuit 300 may have no demand for hydraulic power.

Turning now to FIG. 7, the hydrostatic mode 86 is further illustrated. In particular, a hydrostatic mode 86b is illustrated. The hydrostatic mode 86b is similar to the hydrostatic mode 86a, except that the cross-over flow line 408 is open allowing hydraulic fluid power from the high pressure line 402 to be supplied to the work circuit 300. In the hydrostatic mode 86b, the hydraulic pump/motor 102 and/or the pump/motor 108 may supply hydraulic power to the work circuit 300.

Turning now to FIG. 8, a system forming a second embodiment of the principles of the present disclosure is presented. The system includes the hydraulic system 100', mentioned above. As many of the concepts and features are similar to the first embodiment, shown at FIGS. 1-7, the description for the first embodiment is hereby incorporated by reference for the second embodiment. Where like or similar features or elements are shown, the same reference numbers will be used where possible. The following description for the second embodiment will be limited primarily to the differences between the first and second embodiments. In the hydraulic system 100', the flow control device 206 and the flow control device 208 of the hydraulic system 100 have been replaced by the single three-way valve 207. In addition, the flow control device 212 and the flow control device 224 of the hydraulic system 100 has been replaced by an on-off electrically controlled valve 212' and a constant flow valve 224'. The substitution of the on-off electrically controlled valve 212' and the constant flow valve 224' can be further made in other embodiments of the present disclosure. Likewise, the flow control device 212 and the flow control device 224 can be substituted in the present embodiment.

Turning now to FIG. 9, a schematic layout of the work machine 50 is illustrated. In the depicted embodiment, the work machine 50 is a fork truck.

Figure 10:
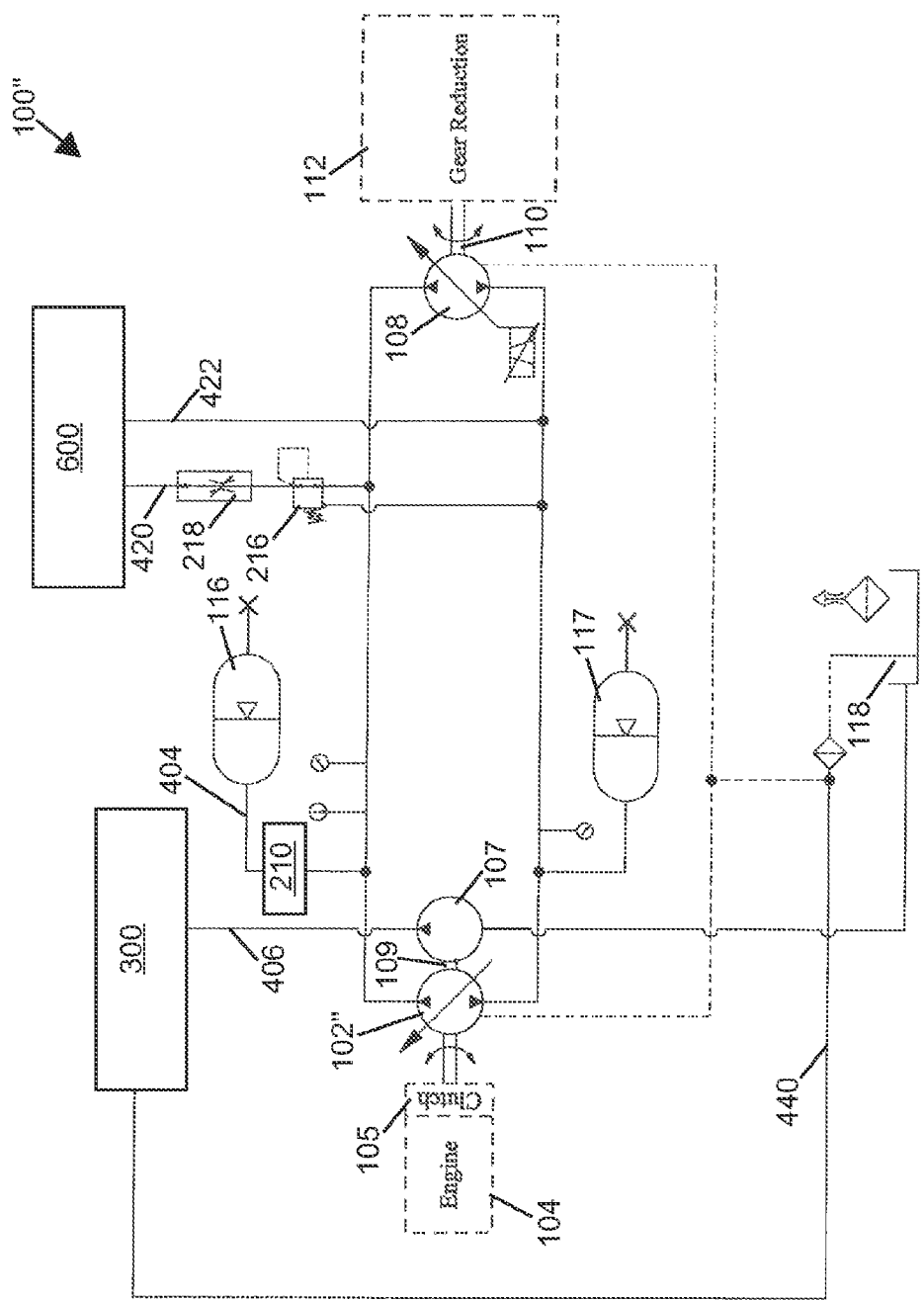
FIG. 10 is a schematic diagram of still another hydraulic system having features that are examples according to the principles of the present disclosure.

Turning now to FIG. 10, a system forming a third embodiment of the principles of the present disclosure is schematically illustrated. The system includes a hydraulic system 100". As with the hydraulic system 100, the hydraulic system 100" similarly powers the work circuit 300. However, in the hydraulic system 100" a hydraulic pump 107 is used to provide hydraulic power to the work circuit 300. The hydraulic pump 107, in turn, is connected by a shaft 109 to a pump/motor 102". A clutch 105 is operably connected between the prime mover 104 and the hydraulic pump/motor 102". A low pressure accumulator 117 (i.e., a storage accumulator) is further included connected to a low pressure side of the hydraulic pump/motor 102".

By placing the hydraulic pump/motor 102" at a zero swash plate displacement angle, power can flow from the prime mover 104 through the clutch 105 and into the hydraulic pump 107. Thus, power from the prime mover 104 can directly power the work circuit 300. While the prime mover 104 is directly powering the work circuit 300, the hydraulic accumulator 116 can be both supplying and receiving power from the pump/motor 108. Thus, the hydraulic system 100" has a mode similar to the work circuit primary mode 82, illustrated at FIG. 3.

Hydraulic power from the hydraulic accumulator 116 can be used to start the prime mover 104. In particular, hydraulic power flows from the hydraulic accumulator 116, through fluid flow control device 210, and into the hydraulic pump/motor 102". The clutch 105 can be engaged and thereby the hydraulic pump/motor 102" can start the prime mover 104.

The hydraulic pump/motor 102", the hydraulic accumulator 116, the pump/motor 108, and the prime mover 104 can operate in a hybrid propel mode similar to the hybrid propel mode 84. When hydraulic power is required by the work circuit 300, the hydraulic pump 107 can receive power from the hydraulic pump/motor 102" via the shaft 109. Thus, the hydraulic system 100" has a mode similar to the hybrid mode 84b, illustrated at FIG. 5.

The hydraulic accumulator 116 can be isolated from the pump/motor 108 by closing the fluid flow control device 210. In this way, the hydraulic system 100" can operate in a hydrostatic mode similar to the hydrostatic mode 86. If the work circuit 300 requires hydraulic power, the hydraulic pump 107 may receive power from the hydraulic pump/motor 102" via the shaft 109.

According to the principles of the present disclosure, an example algorithm may be incorporated in the control of the hydraulic system 100. The example algorithm includes nine major components.

The first major component of the example algorithm is selecting the hydrostatic mode (e.g., the hydrostatic mode 86) with the transmission mode supervisor when the following conditions are met.

Current mode is hybrid mode AND
Pressure target is greater than a specific calibration AND
Pressure target is greater than the high pressure accumulator pressure AND
Accelerator pedal command (e.g., percentage) is greater than a calibrated value (e.g., 50%) AND
Hydrostatic mode is enabled AND
Work circuit flow demand is zero AND
Vehicle speed is less than a specific calibration (e.g., 7 MPH) AND
Vehicle is hot shifted at low specific calibrated speed OR vehicle is not hot shifted The second major component of the example algorithm includes: a) commanding the drive motor displacement target to 100% (or some other predetermined value) and b)

changing the engine pump mode from hybrid mode to a transition mode between the hybrid and hydrostatic modes with the engine and pump supervisory process. In particular, the engine and pump supervisory process (i.e., the engine supervisor) calculates three critical targets: a) engine state (on/off), b) engine speed target, and c) engine pump displacement target. The following summarizes the calculations used to calculate these values.

The engine state target is changed to the "on" state in hydrostatic mode.

The engine power target $\mathbb{P}_{target}$ is calculated from the fundamental equation:

$$\mathbb{P}_{target} = P_{target} Q_{reqd} \text{ where:}$$

$P_{target}$ is the pressure target calculated from operator commands $Q_{reqd}$ is the engine pump flow required to achieve the pressure target $Q_{reqd}$ is calculated using:

$$Q_{reqd} = Q_{dm} + Q_{wc} + Q_{leak} + Q_{ep\text{-}target}$$

Where:
$Q_{dm}$ is the existing drive motor flow consumption
$Q_{wc}$ is the existing work circuit flow consumption
$Q_{leak}$ is the existing system leakage
$Q_{ep\text{-}tgt}$ is the additional engine pump flow required into the manifold to achieve the target pressure $Q_{dm}$ is calculated using:

$$Q_{dm} = \omega_{dm} D_{max\text{-}dm} x_{dm}$$

Where:
$\omega_{dm}$ is the sensed drive motor speed
$D_{max\text{-}dm}$ is the theoretical maximum drive motor displacement
$x_{dm}$ is the sensed fraction of maximum drive motor displacement $Q_{wc}$ is calculated using:

$$Q_{wc} = Q_{lift\text{-}dmd} + Q_{tilt\text{-}dmd} + Q_{shift\text{-}dmd}$$

Where:
$Q_{lift\text{-}dmd}$ is the lift flow demand
$Q_{tilt\text{-}dmd}$ is the tilt flow demand
$Q_{shift\text{-}dmd}$ is the shift flow demand
The flow demand for each service is calculated using:

$$Q_{x\text{-}dmd} = dmr_x A_{x\text{-}cyl}$$

Where:
$dmr_x$ is the driver mast request (dmr) speed for service "x"
The "dmr" for each service is a calibrated look up table of target cylinder speed vs. operator lever command.
$A_{x\text{-}cyl}$ is the cross-sectional area of the cylinder for service "x"

$Q_{leak}$ is estimated from a transfer function based on sensitive factors such as drive motor speed, engine pump speed, and system pressure.

$Q_{ep\text{-}tgt}$ is calculated from:

$$Q_{ep\text{-}tgt} = \frac{V_{fl\text{-}cur} - V_{fl\text{-}tgt}}{DT_{tgt}}$$

The basis for this equation is to calculate how much additional fluid needs to be pumped into the manifold to achieve the target system pressure.

Where:
$V_{fl\text{-}cur}$ is the current volume of fluid in the system manifold
$V_{fl\text{-}cur}$ is calculated from:

$$V_{fl\text{-}cur} = \frac{P_{man}}{B/V_{man}} + V_{man}$$

The basis for this equation is that of a fixed manifold block pressure calculation solved for the current volume of fluid in the manifold
Where:
$P_{man}$ is the sensed pressure in the system manifold
$V_{man}$ is the volume of the system manifold cavity
B is the bulk modulus of the hydraulic system fluid
$V_{fl\text{-}tgt}$ is the target volume of fluid in the system manifold
The basis for this equation is that of a fixed manifold block pressure calculation solved for the current volume of fluid in the manifold
$V_{fl\text{-}tgt}$ is calculated from:

$$V_{fl\text{-}cur} = \frac{P_{target}}{B/V_{man}} + V_{man}$$

Where:
$P_{target}$ is the target pressure as described earlier
$V_{man}$ is the volume of the system manifold cavity
B is the bulk modulus of the hydraulic system fluid
$DT_{tgt}$ is the target time to achieve the target volume of fluid in the system manifold.
This value is a calibration but will control the speed of the reaction to a change in pressure target. The smaller $DT_{tgt}$ is, the faster the algorithm will react.

The engine speed target $\omega_{eng\text{-}tgt}$ is calculated using an appropriate method.

The engine pump displacement target is calculated using:

$$x_{ep} = \frac{\mathbb{P}_{target}}{P_{man} D_{max\text{-}ep} \omega_{eng\text{-}tgt}}.$$

This equation is based on the fundamental equation to calculate power from torque and speed.
Where:
$\mathbb{P}_{target}$ is the engine power target (calculated above)
$D_{max\text{-}ep}$ is the theoretical maximum engine pump displacement
$\omega_{eng\text{-}tgt}$ is the engine speed target (calculated above)
$P_{man}$ is the sensed pressure in the system manifold under normal hydrostatic mode operation. When the system is in transition states the following pressure values are used:
1.) If the high pressure accumulator (hpa) isolation valve target is to be open, then the pressure target should be used to calculate pump displacement. This is to predict what the pressure will be once the valve closes and prevent the pressure from spiking once the hpa isolation valve is closed.

2.) Otherwise, if target isolation valve is closed, but the transmission mode is still not hydrostatic, very likely there will be a pressure spike appearing. Use the max hpa pressure calibration value to limit what the system pressure will be and this will keep pump displacement target from reducing too much and hence prevent the pressure from cavitating once the initial pressure spike is over.

If neither of the above is true and if the pressure in the manifold has begun to cavitate and sensors are reporting a value less than a small (calibration) value (e.g., 10 bar) replace that small value with 10 bar by default to prevent divide by zero errors when calculating the resulting pump displacement. (see the equation above). This also keeps continuity for the transition.

The third major component of the example algorithm includes configuring valves to be compatible with the hydrostatic mode with the valve supervisor. In particular:
 i. The Main Isolation valve is commanded to be open
 ii. The EP on valve is commanded to be shut
 iii. The EP off valve is commanded to provide work circuit flow as is required from the operator commands
 iv. The valve supervisor closes the high pressure accumulator isolation valve once the following conditions are true:
  1. The selected transmission mode is hydrostatic
  2. The drive motor pressure rate of change is greater than zero or small value. (Calibration).
   This is required because a positive drive motor pressure rate of change indicates that the engine pump has achieved equivalent or slightly higher flow output than the system is consuming. If the high pressure accumulator isolation valve commanded to be closed right as the engine pump flow output matches the system flow consumption, there will be flow continuity and the manifold pressure will behave in a predictable manner (this is the desired scenario). If flow matching is not achieved before the valve is closed the vehicle will either surge or drop in speed. Surging will occur when the engine pump is providing significantly more flow than the drive motor is consuming. If the engine pump is providing less flow than the drive motor is consuming, the drive motor will begin to cavitate and deceleration will occur until pump flow is matched with motor flow. Additionally, if pump control pressure is dependent upon the developed hydrostatic line pressure, control pressure will be lost and the drive motor and engine pump will return to their default positions until control pressure is restored.
  3. Engine speed target is greater than a specified calibration (larger than engine idle speed)
  4. Engine speed is greater than a specified calibration. (Should be same as calibration from previous)
   The engine will stall at low speeds if the high pressure accumulator isolation valve is closed. The stall is caused by pressure spikes and slow engine pump displacement response to the resulting torque caused by the pressure spike. This high torque is greater than the maximum engine torque at the particular speed and hence the engine stalls. At higher speeds the engine is more able to handle a transitory torque spike than at low speeds due to rotational inertia, higher torque capacity, and the larger recovery time allowed before an engine stall would occur. The reason for the target and actual engine speed requirements is that the system should only close the valve when engine speed has been requested and observed to be above this value. It prevents bad calibrations and accidental shifts because of engine speed oscillations.
  5. Drive motor pressure is greater than the high pressure accumulator pressure by a calibrated value (usually a small negative value)
   This requirement is to prevent the high pressure accumulator isolation valve from closing (e.g., immediately closing) after opening. It requires that normal hybrid pressure (based on the high pressure accumulator pressure) is restored before re-attempting to enter hydrostatic mode. This prevents rapid oscillations of the high pressure accumulator isolation valve during transitions into hydrostatic mode.
 v. The valve supervisor opens the HPA isolation valve while the system is in hydrostatic mode in the following events:
  1. The drive motor pressure drops below a calibrated level (e.g., 50 bar)
   This is to prevent cavitation in the motor and a loss of torque output.
  2. The engine state status is sensed as "Off" (not ready to pump)
   This is to ensure the motor has a stable source of hydraulic oil.

The fourth major component of the example algorithm includes determining that the current transmission mode is hydrostatic with the transmission mode supervisor when the following conditions are met.
 Low level state is "Accel" (i.e., operator intent indicates work machine should accelerate) AND
 The engine is confirmed to be "on" and "ready" for the engine pump displacement to increase AND
 The high pressure accumulator isolation valve is confirmed to be closed AND
 The ep on valve is confirmed to be closed AND
 The main isolation valve is confirmed to be open AND
 The drive motor displacement status is confirmed to be greater than a specified value (e.g., calibration ~90%) AND
 The previous selected transmission mode is hydrostatic AND
 hydrostatic mode is enabled The fifth major component of the example algorithm includes changing the engine pump mode from the transition mode to the hydrostatic mode once the current transmission mode is hydrostatic. The engine behavior may be the same as in the transition mode.

The sixth major component of the example algorithm includes exiting the hydrostatic mode with the transmission mode supervisor when the conditions below are met for a predetermined period of time.
 The target pressure is less than the high pressure accumulator pressure status OR
 The accelerator pedal is less than a calibrated value OR
 The low level state is "Decelerate" OR
 The low level state is "Neutral" OR
 The engine state is "Off" (i.e., not ready to pump)

The seventh major component of the example algorithm includes exiting the hydrostatic mode immediately when a system fault is detected.

The eighth major component of the example algorithm includes exiting the hydrostatic mode with the engine pump when the transmission mode supervisor exits the hydrostatic mode and transitions to normal hybrid mode.

The ninth major component of the example algorithm includes opening the high pressure accumulator isolation valve when the transmission mode supervisor exits HSTAT mode.

In certain embodiments, the functions or sets of functions described above may be accomplished with a single drive pump component (e.g., a single pump, a single pump/motor, a single pumping rotating group, etc.). As used herein, the term "pump" indicates the ability to transfer fluid from a lower pressure to a higher pressure over a duration sufficient to power a function. The single drive pump may include a charge pump. As used herein, the terms "drive pump" and "drive hydraulic pump" indicate a pump or pump/motor that is driven by the prime mover (e.g., directly mechanically driven).

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the disclosure.

What is claimed is:

1. A method of configuring a propulsion mode of a mobile work vehicle having a hydraulic circuit system including a high pressure line extending between an engine-pump assembly, a work circuit, and a propel circuit, the engine-pump assembly including a prime mover and a hydraulic pump/motor, the work circuit including an actuator for powering a work component of the mobile work vehicle, the propel circuit including a drive motor for powering propulsion elements of the mobile work vehicle through a drivetrain, the hydraulic circuit system including a hydraulic accumulator that is selectively coupled to the high pressure line via an accumulator isolation valve, the mobile work vehicle being configured to selectively operate in a hybrid propulsion mode and a hydrostatic propulsion mode, the method comprising:
    determining if a selected propulsion mode is the hydrostatic propulsion mode;
    substantially matching a flow output of the engine-pump assembly to a system flow consumption if the selected propulsion mode is the hydrostatic propulsion mode; and
    closing the accumulator isolation valve to isolate the hydraulic accumulator from the high pressure line when the engine-pump flow output matches the system flow consumption and the selected propulsion mode is the hydrostatic propulsion mode.

2. The method of claim 1, further comprising configuring a drive motor displacement target of the drive motor to a pre-determined displacement if the selected propulsion mode is the hydrostatic propulsion mode.

3. The method of claim 2, wherein the pre-determined displacement is full displacement.

4. The method of claim 1, wherein the hybrid propulsion mode includes pressure based control and the hydrostatic propulsion mode includes displacement based control.

5. The method of claim 1, further comprising calculating the system flow consumption and thereby maintaining flow continuity when closing the accumulator isolation valve.

6. The method of claim 5, wherein the calculating of the system flow consumption includes calculating a flow consumption of a work circuit.

7. The method of claim 5, wherein the calculating of the system flow consumption includes calculating a flow consumption of a steering circuit.

8. The method of claim 1, wherein determining if the selected propulsion mode is the hydrostatic propulsion mode includes evaluating if an acceleration request of an operator requires a propulsion pressure target that is greater than an accumulator pressure of the hydraulic accumulator.

9. The method of claim 1, wherein determining if the selected propulsion mode is the hydrostatic propulsion mode includes determining if the hydrostatic propulsion mode is enabled.

10. The method of claim 1, further comprising:
    setting an engine state target to an on state when the accumulator isolation valve is closed;
    setting an engine speed target to a calculated value when the accumulator isolation valve is closed; and
    configuring a valve set in a configuration compatible with the hydrostatic propulsion mode when the accumulator isolation valve is closed.

11. The method of claim 1, further comprising opening the accumulator isolation valve when in the hydrostatic propulsion mode and when a drive motor pressure drops below a predetermined level.

12. The method of claim 1, wherein the accumulator isolation valve is closed both when the engine-pump flow output matches the system flow consumption and a drive-motor pressure rate of change is greater than a predetermined value.

13. The method of claim 1, further comprising powering the hybrid propulsion mode and the hydrostatic propulsion mode with a same pump.

14. The method of claim 1, wherein the propulsion elements of the work vehicle includes either wheels or tracks.

15. The method of claim 1, further comprising using energy accumulated in the hydraulic accumulator to provide power for starting a power source used to drive the hydraulic propulsion pump/motor.

16. The method of claim 15, further comprising using energy accumulated in the hydraulic accumulator to provide propulsion functionality even when the power source coupled to the hydraulic propulsion pump/motor is not operating.

17. The method of claim 15, further comprising using energy accumulated in the hydraulic accumulator to provide work circuit functionality.

18. A method of configuring a propulsion mode of a mobile work vehicle having a hydraulic circuit system including a high pressure line extending between an engine-pump assembly, a hydraulic accumulator, and a drive motor for powering propulsion elements of the mobile work vehicle through a drivetrain, the hydraulic circuit system including an accumulator isolation valve that selectively couples the hydraulic accumulator to the high pressure line, the mobile work vehicle being configured to selectively operate in a hybrid propulsion mode and a hydrostatic propulsion mode, the method comprising:
    determining if a selected propulsion mode is the hydrostatic propulsion mode;
    substantially matching a flow output of the engine-pump assembly to a system flow consumption if the selected propulsion mode is the hydrostatic propulsion mode; and closing the accumulator isolation valve to isolate the hydraulic accumulator from the high pressure line when the engine-pump flow output matches the system flow consumption and the selected propulsion mode is the hydrostatic propulsion mode;

configuring a drive motor displacement target of the drive motor to a pre-determined displacement if the selected propulsion mode is the hydrostatic propulsion mode, wherein the pre-determined displacement is full displacement.

19. A method of configuring a propulsion mode of a mobile work vehicle having a hydraulic circuit system including a high pressure line extending between an engine-pump assembly, a hydraulic accumulator, and a drive motor for powering propulsion elements of the mobile work vehicle through a drivetrain, the hydraulic circuit system including an accumulator isolation valve that selectively couples the hydraulic accumulator to the high pressure line, the mobile work vehicle being configured to selectively operate in a hybrid propulsion mode and a hydrostatic propulsion mode, wherein the hybrid propulsion mode includes pressure based control and the hydrostatic propulsion mode includes displacement based control, the method comprising:

determining if a selected propulsion mode is the hydrostatic propulsion mode;

substantially matching a flow output of the engine-pump assembly to a system flow consumption if the selected propulsion mode is the hydrostatic propulsion mode; and closing the accumulator isolation valve to isolate the hydraulic accumulator from the high pressure line when the engine-pump flow output matches the system flow consumption and the selected propulsion mode is the hydrostatic propulsion mode.

20. A method of configuring a propulsion mode of a mobile work vehicle having a hydraulic circuit system including a high pressure line extending between an engine-pump assembly, a hydraulic accumulator, and a drive motor for powering propulsion elements of the mobile work vehicle through a drivetrain, the hydraulic circuit system including an accumulator isolation valve that selectively couples the hydraulic accumulator to the high pressure line, the mobile work vehicle being configured to selectively operate in a hybrid propulsion mode and a hydrostatic propulsion mode, the method comprising:

determining if a selected propulsion mode is the hydrostatic propulsion mode, wherein determining if the selected propulsion mode is the hydrostatic propulsion mode includes evaluating if an acceleration request of an operator requires a propulsion pressure target that is greater than an accumulator pressure;

substantially matching a flow output of the engine-pump assembly to a system flow consumption if the selected propulsion mode is the hydrostatic propulsion mode; and closing the accumulator isolation valve to isolate the hydraulic accumulator from the high pressure line when the engine-pump flow output matches the system flow consumption and the selected propulsion mode is the hydrostatic propulsion mode.

21. A method of configuring a propulsion mode of a mobile work vehicle having a hydraulic circuit system including a high pressure line extending between an engine-pump assembly, a hydraulic accumulator, and a drive motor for powering propulsion elements of the mobile work vehicle through a drivetrain, the hydraulic circuit system including an accumulator isolation valve that selectively couples the hydraulic accumulator to the high pressure line, the mobile work vehicle being configured to selectively operate in a hybrid propulsion mode and a hydrostatic propulsion mode, the method comprising:

determining if a selected propulsion mode is the hydrostatic propulsion mode, wherein determining if the selected propulsion mode is the hydrostatic propulsion mode includes determining if the hydrostatic propulsion mode is enabled;

substantially matching a flow output of the engine-pump assembly to a system flow consumption if the selected propulsion mode is the hydrostatic propulsion mode; and closing the accumulator isolation valve to isolate the hydraulic accumulator from the high pressure line when the engine-pump flow output matches the system flow consumption and the selected propulsion mode is the hydrostatic propulsion mode.

22. A method of configuring a propulsion mode of a mobile work vehicle having a hydraulic circuit system including a high pressure line extending between an engine-pump assembly, a hydraulic accumulator, and a drive motor for powering propulsion elements of the mobile work vehicle through a drivetrain, the hydraulic circuit system including an accumulator isolation valve that selectively couples the hydraulic accumulator to the high pressure line, the mobile work vehicle being configured to selectively operate in a hybrid propulsion mode and a hydrostatic propulsion mode, the method comprising:

determining if a selected propulsion mode is the hydrostatic propulsion mode;

substantially matching a flow output of the engine-pump assembly to a system flow consumption if the selected propulsion mode is the hydrostatic propulsion mode; and closing the accumulator isolation valve to isolate the hydraulic accumulator from the high pressure line when the engine-pump flow output matches the system flow consumption and the selected propulsion mode is the hydrostatic propulsion mode, wherein the accumulator isolation valve is closed both when the engine-pump flow output matches the system flow consumption and a drive-motor pressure rate of change is greater than a predetermined value.

* * * * *